(12) United States Patent
Xing

(10) Patent No.: US 12,035,285 B2
(45) Date of Patent: Jul. 9, 2024

(54) RESOURCE CONFIGURATION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Jinqiang Xing, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 511 days.

(21) Appl. No.: 17/490,763

(22) Filed: Sep. 30, 2021

(65) Prior Publication Data

US 2022/0022177 A1 Jan. 20, 2022

Related U.S. Application Data

(63) Continuation of application No. PCT/CN2019/087303, filed on May 16, 2019.

(30) Foreign Application Priority Data

Apr. 4, 2019 (WO) ................. PCT/CN2019/081609
Apr. 30, 2019 (WO) ................. PCT/CN2019/085367

(51) Int. Cl.
*H04W 72/044* (2023.01)
*H04B 1/3827* (2015.01)
*H04W 8/24* (2009.01)
*H04W 76/15* (2018.01)

(52) U.S. Cl.
CPC ........ *H04W 72/044* (2013.01); *H04B 1/3838* (2013.01); *H04W 8/24* (2013.01); *H04W 76/15* (2018.02)

(58) Field of Classification Search
CPC .......................... H04B 1/3838; H04W 52/225; H04W 52/367; H04W 72/044; H04W 72/51; H04W 76/15; H04W 76/16; H04W 8/24
See application file for complete search history.

(56) References Cited

U.S. PATENT DOCUMENTS 10,104,709 B2 * 10/2018 Ahn ................. H04W 76/10
10,904,745 B2 * 1/2021 Lee .................. H04W 72/04
(Continued)

FOREIGN PATENT DOCUMENTS

CN 108702761 A 10/2018
CN 109151931 A 1/2019
(Continued)

OTHER PUBLICATIONS

U.S. Appl. No. 62/755,199 (Year: 2018).*
(Continued)

*Primary Examiner* — Dung B Huynh
(74) *Attorney, Agent, or Firm* — Ladas & Parry LLP

(57) ABSTRACT

The present application discloses a resource configuration method, a terminal device, a network device, a chip, a computer readable storage medium, a computer program product and a computer program, and the method includes: sending capability reference information of the terminal device to a first network and/or a second network; where the capability reference information is at least configured to assist a first network device of the first network and a second network device of the second network to allocate uplink time-domain resources for the terminal device; and acquiring an uplink time-domain resource configuration of the terminal device in the first network, and an uplink time-domain resource configuration of the terminal device in the second network.

13 Claims, 8 Drawing Sheets

(56) References Cited

U.S. PATENT DOCUMENTS

| | | | |
|---|---|---|---|
| 11,039,302 B2* | 6/2021 | Chang | H04W 72/1268 |
| 11,641,658 B2* | 5/2023 | Kim | H04W 56/0045 |
| | | | 455/552.1 |
| 2011/0136484 A1* | 6/2011 | Braun | H04W 52/46 |
| | | | 455/422.1 |
| 2011/0200032 A1* | 8/2011 | Lindstrom | H04W 56/0005 |
| | | | 370/350 |
| 2012/0021707 A1* | 1/2012 | Forrester | H04W 52/30 |
| | | | 455/115.3 |
| 2012/0257513 A1* | 10/2012 | Yamada | H04W 72/21 |
| | | | 370/328 |
| 2013/0051288 A1* | 2/2013 | Yamada | H04L 5/001 |
| | | | 370/280 |
| 2013/0208587 A1* | 8/2013 | Bala | H04W 72/0446 |
| | | | 370/278 |
| 2013/0260763 A1* | 10/2013 | Bhattad | H04B 17/345 |
| | | | 455/450 |
| 2013/0279435 A1* | 10/2013 | Dinan | H04W 52/40 |
| | | | 370/329 |
| 2014/0023030 A1* | 1/2014 | Jeong | H04W 28/04 |
| | | | 370/329 |
| 2014/0146907 A1* | 5/2014 | Kim | H04W 72/23 |
| | | | 375/267 |
| 2014/0335882 A1* | 11/2014 | Lee | H04W 76/15 |
| | | | 455/452.2 |
| 2014/0362824 A1* | 12/2014 | Rousu | H04L 5/001 |
| | | | 370/331 |
| 2015/0092707 A1* | 4/2015 | Kwon | H04W 76/38 |
| | | | 370/329 |
| 2015/0098322 A1* | 4/2015 | Chen | H04W 28/0864 |
| | | | 370/230 |
| 2015/0139175 A1* | 5/2015 | Ratasuk | H04L 5/0007 |
| | | | 370/330 |
| 2015/0163794 A1* | 6/2015 | Liang | H04W 72/23 |
| | | | 370/329 |
| 2015/0208366 A1* | 7/2015 | Papasakellariou | H04W 52/146 |
| | | | 370/311 |
| 2015/0215825 A1* | 7/2015 | Kim | H04W 36/0088 |
| | | | 370/331 |
| 2015/0244429 A1* | 8/2015 | Zhang | H04B 7/024 |
| | | | 370/329 |
| 2015/0312902 A1* | 10/2015 | Yoshizawa | H04W 72/52 |
| | | | 370/329 |
| 2015/0334705 A1* | 11/2015 | Zhao | H04W 36/22 |
| | | | 370/329 |
| 2016/0029401 A1* | 1/2016 | Fukuta | H04W 72/12 |
| | | | 370/329 |
| 2016/0192350 A1* | 6/2016 | Yi | H04L 5/0035 |
| | | | 370/329 |
| 2016/0198486 A1* | 7/2016 | Moshavi | H04W 72/12 |
| | | | 455/450 |
| 2016/0205681 A1* | 7/2016 | Kim | H04W 72/21 |
| | | | 370/329 |
| 2016/0219475 A1* | 7/2016 | Kim | H04W 36/0009 |
| 2016/0234714 A1* | 8/2016 | Basu Mallick | H04W 16/32 |
| 2016/0262118 A1* | 9/2016 | Kim | H04W 52/365 |
| 2016/0270139 A1* | 9/2016 | Rahman | H04W 76/15 |
| 2016/0302209 A1* | 10/2016 | Behravan | H04W 72/541 |
| 2016/0323833 A1* | 11/2016 | Zhang | H04W 52/40 |
| 2017/0006598 A1* | 1/2017 | Uemura | H04W 16/32 |
| 2017/0013563 A1* | 1/2017 | Yang | H04W 52/146 |
| 2017/0070902 A1* | 3/2017 | Fukuta | H04W 36/00692 |
| 2017/0123042 A1* | 5/2017 | Lightstone | H04W 72/23 |
| 2017/0279567 A1* | 9/2017 | Rahman | H04L 5/001 |
| 2017/0302419 A1* | 10/2017 | Liu | H04L 5/0078 |
| 2017/0339511 A1* | 11/2017 | Lee | H04W 72/0446 |
| 2018/0042030 A1* | 2/2018 | Xu | H04L 47/72 |
| 2018/0049206 A1* | 2/2018 | Yerramalli | H04W 16/14 |
| 2018/0092002 A1* | 3/2018 | Manolakos | H04W 72/04 |
| 2018/0098250 A1* | 4/2018 | Vrzic | H04W 36/18 |
| 2018/0167897 A1 | 6/2018 | Sampath et al. | |
| 2018/0332605 A1* | 11/2018 | Pelletier | H04W 72/569 |
| 2018/0343697 A1 | 11/2018 | Hsu et al. | |
| 2019/0037580 A1* | 1/2019 | Oh | H04L 5/1469 |
| 2019/0081657 A1* | 3/2019 | Zeng | H04W 52/146 |
| 2019/0090126 A1* | 3/2019 | Hayashi | H04W 74/02 |
| 2019/0104476 A1* | 4/2019 | Lim | H04W 52/146 |
| 2019/0159049 A1* | 5/2019 | Kim | H04B 7/0417 |
| 2019/0159086 A1* | 5/2019 | Xu | H04W 76/22 |
| 2019/0159140 A1* | 5/2019 | Wang | H04L 5/0082 |
| 2019/0191381 A1* | 6/2019 | Zhang | H04W 52/42 |
| 2019/0253925 A1* | 8/2019 | Gholmieh | H04B 1/005 |
| 2019/0268127 A1* | 8/2019 | Hosseini | H04L 5/0098 |
| 2019/0297662 A1* | 9/2019 | Palat | H04W 76/15 |
| 2019/0387508 A1* | 12/2019 | Park | H04W 72/23 |
| 2020/0015171 A1* | 1/2020 | Nadakuduti | H04W 52/38 |
| 2020/0021421 A1* | 1/2020 | Han | H04L 5/14 |
| 2020/0037383 A1* | 1/2020 | Rico Alvarino | H04L 5/0094 |
| 2020/0053718 A1* | 2/2020 | Huang | H04W 8/24 |
| 2020/0107296 A1* | 4/2020 | Zhang | H04W 52/283 |
| 2020/0128526 A1* | 4/2020 | Yang | H04W 72/51 |
| 2020/0137668 A1* | 4/2020 | Zeng | H04L 5/00 |
| 2020/0145927 A1* | 5/2020 | Sun | H04W 52/146 |
| 2020/0146042 A1* | 5/2020 | Suzuki | H04W 72/20 |
| 2020/0213955 A1* | 7/2020 | Hosseini | H04W 72/0473 |
| 2020/0236696 A1* | 7/2020 | Takahashi | H04W 74/004 |
| 2020/0236710 A1* | 7/2020 | Sun | H04L 5/0016 |
| 2020/0259618 A1* | 8/2020 | Yang | H04W 72/0453 |
| 2020/0260436 A1* | 8/2020 | Hong | H04W 72/23 |
| 2020/0267753 A1* | 8/2020 | Adjakple | H04W 72/54 |
| 2020/0288397 A1* | 9/2020 | Ahn | H04W 52/02 |
| 2020/0314820 A1* | 10/2020 | Kim | H04W 72/0453 |
| 2020/0314942 A1* | 10/2020 | Bai | H04W 80/02 |
| 2020/0337024 A1* | 10/2020 | Tang | H04B 7/0413 |
| 2020/0344832 A1* | 10/2020 | Hu | H04W 72/0453 |
| 2020/0359398 A1* | 11/2020 | Takahashi | H04W 8/22 |
| 2020/0367318 A1* | 11/2020 | Takahashi | H04W 76/15 |
| 2021/0029652 A1* | 1/2021 | Li | H04W 52/365 |
| 2021/0029715 A1* | 1/2021 | Takahashi | H04W 76/15 |
| 2021/0051616 A1* | 2/2021 | Park | H04W 48/16 |
| 2021/0058996 A1* | 2/2021 | Yang | H04W 56/001 |
| 2021/0099859 A1* | 4/2021 | Jiang | H04W 16/14 |
| 2021/0126753 A1* | 4/2021 | Mochizuki | H04W 72/542 |
| 2021/0153022 A1* | 5/2021 | Ohlsson | H04W 12/037 |
| 2021/0160787 A1* | 5/2021 | Zhou | H04W 8/24 |
| 2021/0204227 A1* | 7/2021 | Bergljung | H04W 52/38 |
| 2021/0235258 A1* | 7/2021 | Takeda | H04W 72/53 |
| 2021/0250855 A1* | 8/2021 | Tang | H04W 52/02 |
| 2021/0306824 A1* | 9/2021 | Li | H04W 4/40 |
| 2021/0368500 A1* | 11/2021 | Centonza | H04W 72/541 |
| 2021/0392713 A1* | 12/2021 | Takahashi | H04W 72/51 |
| 2021/0410094 A1* | 12/2021 | Cui | H04W 56/0055 |
| 2022/0007269 A1* | 1/2022 | Kaasalainen | H04L 1/1671 |
| 2022/0015070 A1* | 1/2022 | Chen | H04W 72/23 |
| 2022/0070794 A1* | 3/2022 | Lim | H04B 1/3838 |
| 2022/0078603 A1* | 3/2022 | Takada | H04W 8/22 |
| 2022/0078725 A1* | 3/2022 | Zhou | H04W 52/42 |
| 2022/0124627 A1* | 4/2022 | Oguma | H04W 52/267 |
| 2022/0322168 A1* | 10/2022 | Kang | H04W 36/04 |
| 2022/0346170 A1* | 10/2022 | Takahashi | H04W 8/22 |
| 2022/0369237 A1* | 11/2022 | Cui | H04W 52/146 |
| 2023/0336290 A1* | 10/2023 | Mochizuki | H04W 72/542 |
| 2024/0073796 A1* | 2/2024 | Azizi | H04W 24/08 |

FOREIGN PATENT DOCUMENTS

| | | |
|---|---|---|
| CN | 109152030 A | 1/2019 |
| CN | 109275200 A | 1/2019 |
| CN | 109327235 A | 2/2019 |
| CN | 109451861 A | 3/2019 |
| EP | 3836704 A1 | 6/2021 |
| WO | 2019032124 A1 | 2/2019 |

OTHER PUBLICATIONS

The EESR of corresponding European application No. 19923168.9, dated Mar. 25, 2022.

OPPO:"Discussion on NSA FDD-TDD HPUE SAR solutions". 3GPP Draft; R4-1903055, 3rd Generation Partnership Project (3GPP), Mobile Competence Centre; 650, Route Des Lucioles; F-06921

Sophia-Antipolis Cedex; France, vol. RAN WG4, No. Xi'an, China; Apr. 8, 2019-Apr. 12, 2019 Apr. 1, 2019(Apr. 1, 20191), XP051713517.
RAN WG4:"Draft LS on UE capability of maxUplinkDutyCycle for intra-band EN-DC power class 2 in FR1", 3GPP Draft; R4-1814956, 3rd Generation Partnership Project (3GPP), Mobile Competence Centre; 650, Route Des vol. RAN WG4, No. Spokane, USA; Nov. 12, 2018-Nov. 16, 2018 Nov. 2, 2018(Nov. 2, 2018), XP051478006.
Written Opinion of the International Searching Authority dated Dec. 7, 2019 for Application No. PCT/CN2019/087303.
Written Opinion of the International Searching Authority dated Dec. 26, 2019 for Application No. PCT/CN2019/081609.
Written Opinion of the International Searching Authority dated Dec. 26, 2019 for Application No. PCT/CN2019/085367.
International Search Report (ISR) dated Dec. 19, 2019 for Application No. PCT/CN2019/087303.
International Search Report (ISR) dated Jan. 2, 2020 for Application No. PCT/CN2019/081609.
International Search Report (ISR) dated Jan. 3, 2020 for Application No. PCT/CN2019/085367.
OPPO:"Discussion on NSA TDD-TDD HPUR SAR solutions" 3GPP TSG-RAN WG4 Meeting #90bis R4-1903055 Apr. 1, 2019.
SPRINT:"New WID on 29dBm UE Power Class for B41 and n41" 3GPP TSG-RAN4 #87 R4-1807784 May 25, 2018.

* cited by examiner

1

RESOURCE CONFIGURATION METHOD, NETWORK DEVICE, AND TERMINAL DEVICE

CROSS-REFERENCE TO RELATED APPLICATIONS

The present application is a continuation of International Application No. PCT/CN2019/087303, filed on May 16, 2019, which claims priority to Application No. PCT/CN2019/081609, filed on Apr. 4, 2019, and Application No. PCT/CN2019/085367, filed on Apr. 30, 2019. Contents of the foregoing applications are hereby incorporated by reference in their entireties.

TECHNICAL FIELD

The present application relates to the technical field of information processing, and in particular, to a resource configuration method, a network device, a terminal device, a chip, a computer readable storage medium, a computer program product and a computer program.

BACKGROUND

In order to satisfy a specific absorption rate (SAR) index, a terminal usually adopts a distance sensor or the like to detect a distance between the terminal and the human body, and performs a power back-off method when approaching the human body to reduce transmission power and avoid the SAR exceeding a standard. With the recent tightening of an SAR test method, this solution is more and more unable to guarantee an SAR radiation problem of the terminal in a variety of postures.

The appearance of a high-power terminal (26 dBm) in the Long Term Evolution (LTE) causes more and more attention to a problem of the SAR exceeding the standard, and compared with a common terminal (23 dBm), the transmission power thereof is higher, and an SAR value is higher. In order to solve the problem that the SAR value of the high-power terminal in the LTE exceeds the standard, a method for limiting uplink and downlink time-slot ratios occurs, that is, by excluding configurations with sequence numbers 0 and 6 in uplink and downlink configurations that account for an uplink ratio of more than 50%, uplink transmission time of the terminal is limited to be less than 50%. As the high power terminal is also introduced to the new radio (NR) which has more than 60 configurations, and there are flexible symbols which may be configured as uplink or downlink in each configuration, hence, a terminal capability of a maximum uplink duty cycle (maxULdutycycle) is introduced, that is, the terminal reports its maximum uplink ratio supported in a certain frequency band to a network. When an uplink ratio scheduled by the network exceeds the capability, the terminal adopts a power back-off manner to reduce the SAR value.

However, in the prior art, for a terminal device that needs to support both LTE and NR modes at the same time, no effective resource configuration manner is provided to solve a problem of improving uplink coverage of the LTE and the NR, and ensuring that the SAR does not exceed the standard.

SUMMARY

In order to solve the above technical problem, embodiments of the present application provide a resource configuration method, a network device, a terminal device, a chip, a computer readable storage medium, a computer program product and a computer program.

A first aspect provides a resource configuration method, which is applied to a terminal device, the terminal device is capable of establishing connections with a first network and a second network, and the method includes:
  sending capability reference information of the terminal device to the first network and/or the second network; where the capability reference information is at least configured to assist a first network device of the first network and a second network device of the second network to allocate uplink time-domain resources for the terminal device; and
  acquiring an uplink time-domain resource configuration of the terminal device in the first network, and an uplink time-domain resource configuration of the terminal device in the second network.

A second aspect provides a resource configuration method, which is applied to a first network device in a first network, the first network device establishes a connection with a terminal device, and the method includes:
  acquiring capability reference information of the terminal device, where the terminal device is capable of establishing connections with the first network and a second network; and
  allocating an uplink time-domain resource in the first network for the terminal device based on the capability reference information.

A third aspect provides a resource configuration method, which is applied to a second network device in a second network, the second network device establishes a connection with a terminal device, and the method includes:
  acquiring capability reference information of the terminal device, where the terminal device is capable of establishing connections with the first network and a second network; and
  at least allocating an uplink time-domain resource in the second network for the terminal device based on the capability reference information.

A fourth aspect provides a terminal device, including:
  a first communicating unit, which is capable of establishing connections with a first network and a second network, configured to send capability reference information of the terminal device to the first network and/or the second network; where the capability reference information is at least configured to assist a first network device of the first network and a second network device of the second network to allocate uplink time-domain resources for the terminal device; and acquire an uplink time-domain resource configuration of the terminal device in the first network, and an uplink time-domain resource configuration of the terminal device in the second network.

A fifth aspect provides a first network device, and the first network device is located in a first network, including:
  a second communicating unit, configured to establish a connection with a terminal device, and acquire capability reference information of the terminal device; where the terminal device is capable of establishing connections with the first network and a second network; and
  a second processing unit, configured to allocate an uplink time-domain resource in the first network for the terminal device based on the capability reference information.

A sixth aspect provides a second network device, and the second network device is located in a second network, including:
  a third communicating unit, configured to establish a connection with a terminal device, and acquire capability reference information of the terminal device; where the terminal device is capable of establishing connections with a first network and the second network; and
  a third processing unit, configured to at least allocate an uplink time-domain resource in the second network for the terminal device based on the capability reference information.

A seventh aspect provides a terminal device, including: a processor and a memory. The memory is configured to store a computer program, and the processor is configured to invoke and run the computer program stored in the memory, so as to execute the method according to the first aspect or each implementation thereof.

An eighth aspect provides a network device, including: a processor and a memory. The memory is configured to store a computer program, and the processor is configured to invoke and run the computer program stored in the memory, so as to execute the method according to the second aspect, the third aspect, or each implementation thereof.

A ninth aspect provides a chip, which is configured to implement the method according to any one of the first aspect to the third aspect or each implementation thereof.

Specifically, the chip includes: a processor, configured to invoke and run a computer program from a memory, so as to cause a device equipped with the chip to execute the method according to any one of the first aspect to the third aspect or each implementation thereof.

A tenth aspect provides a computer readable storage medium, which is configured to store a computer program, and the computer program causes a computer to execute the method according to any one of the first aspect to the third aspect or each implementation thereof.

An eleventh aspect provides a computer program product, which includes computer program instructions, and the computer program instructions cause a computer to execute the method according to any one of the first aspect to the third aspect or each implementation thereof.

A twelfth aspect provides a computer program, which, when being run on a computer, causes the computer to execute the method according to any one of the first aspect to the third aspect or each implementation thereof.

By adopting the above solution, the terminal device can send the capability reference information to a network side to assist the network side to determine respective uplink time-domain resource configurations corresponding to two networks based on the capability reference information, thus, a determination of the uplink time-domain resources of the terminal device no longer depends on a terminal alone, instead, the uplink time-domain resources are jointly limited by two networks connected by the terminal device, that is, uplink transmission time is controlled. In this way, an effect of reducing radiation can be achieved, and the uplink time-domain resources of the terminal device are configured by the two networks connected with the terminal device, thus, an uplink coverage can be ensured to a maximum extent.

DESCRIPTION OF EMBODIMENTS

In order to understand the features and technical contents of embodiments of the present application in more detail, the implementation of the embodiments of the present application will be described in detail below with reference to accompanying drawings, and the accompanying drawings are merely used for description, and are not intended to limit the embodiments of the present application.

Hereinafter, technical solutions in the embodiments of the present application will be described with reference to the accompanying drawings in the embodiments of the present application. Apparently, the described embodiments are a part of the embodiments of the present application, rather than all of the embodiments. Based on the embodiments of the present application, all other embodiments obtained by a person of ordinary skill in the art without paying creative efforts all belong to the protection scope of the present application.

The technical solutions in the embodiments of the present application may be applied to various communication systems, for example, a Global System of Mobile communication (GSM), a Code Division Multiple Access (CDMA)

system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figure 1:
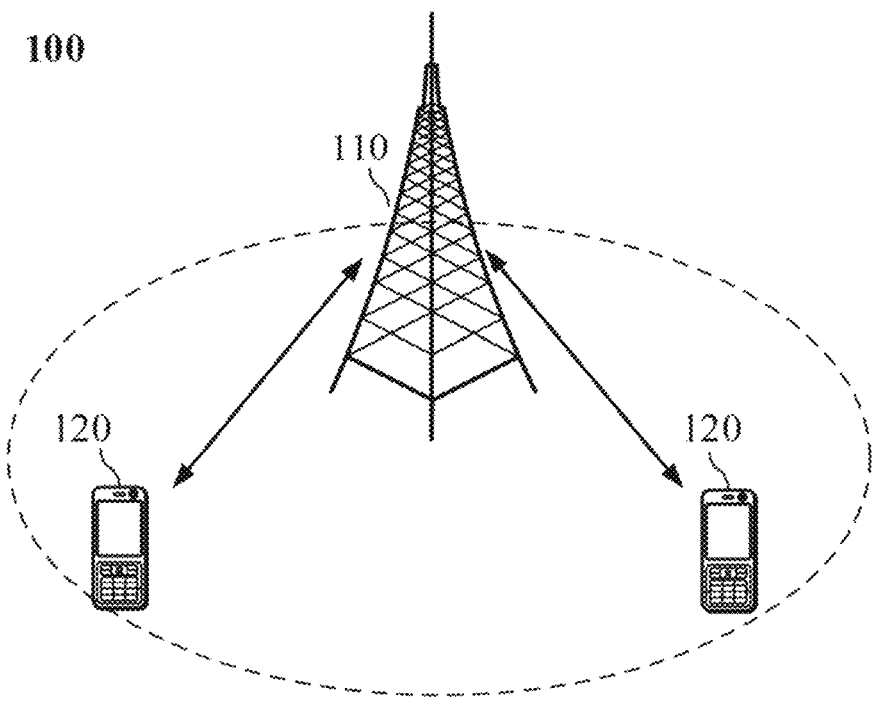
FIG. 1 is a first schematic diagram of a communication system architecture according to an embodiment of the present application.

Illustratively, a communication system 100 to which an embodiment of the present application is applied may be shown in FIG. 1. The communication system 100 may include a network device 110, and the network device 110 may be a device in communication with a User Equipment (UE) 120 (or referred to as a communication terminal or a terminal). The network device 110 may provide communication coverage for a specific geographic area and may communicate with the UE located within the coverage area. In an embodiment, the network device 100 may be a network device (Base Transceiver Station, BTS) in a GSM system or a CDMA system, it may also be a network device (Node B, NB) in a WCDMA system, it may also be an evolutional network device (Evolutional Node B, an eNB or an eNodeB) in an LTE system, or it is a wireless controller in a Cloud Radio Access Network (Cloud Radio Access Network, CRAN), or the network device may be a mobile switching center, a relay station, an access point, a vehicle-mounted device, a wearable device, a hub, a switch, a bridge, a router, a network-side device in a 5G network, or a network device in a future evolved Public Land Mobile Network (Public Land Mobile Network, PLMN), etc.

The communication system 100 further includes at least one UE 120 within the coverage of the network device 110. The "UE" used herein includes, but is not limited to, an apparatus connected via a wired line, such as a Public Switched Telephone Network (PSTN), a Digital Subscriber Line (DSL), a digital cable, and a cable; and/or another data connectivity/network; and/or via a wireless interface, for example, for a cellular network, a Wireless Local Area Network (WLAN), a digital television network such as a DVB-H network, a satellite network, and an AM-FM broadcast transmitter; and/or another UE configured to receive/send a communication signal; and/or an Internet of Things (IoT) device. The UE configured to communicate through a wireless interface may be referred to as a "wireless communication terminal", a "wireless terminal", or a "mobile terminal".

In an embodiment, Device to Device (D2D) communication may be performed between UE 120.

It should be understood that, the terms "system" and "network" are often used interchangeably herein. The term "and/or" herein is merely an association relationship describing an associated object, and indicates that there may be three relationships. For example, A and/or B may indicate that there are three cases: A alone, A and B together, and B alone. In addition, the character "/" herein generally indicates that the front and back associated objects are of an "or" relationship.

In order to understand the features and technical contents of the embodiments of the present application in more detail, the implementation of the embodiments of the present application will be described in detail below with reference to the accompanying drawings. The accompanying drawings are merely used for description, and are not intended to limit the embodiments of the present application.

Figure 2:
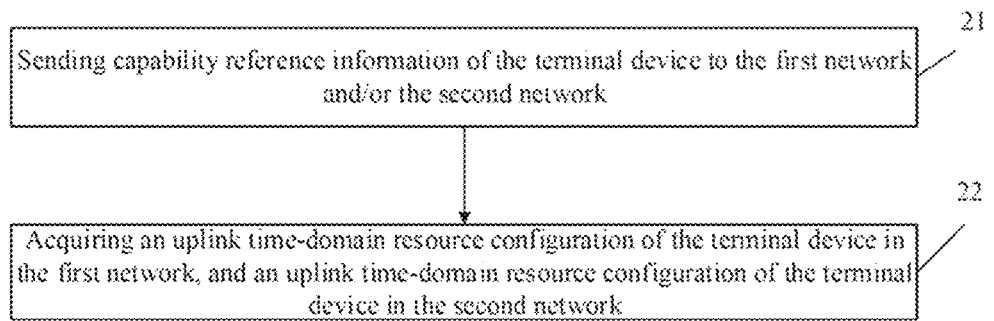
FIG. 2 is a first schematic flowchart of a resource configuration method according to an embodiment of the present application.

An embodiment of the present application provides a resource configuration method, which is applied to a terminal device, the terminal device is capable of establishing connections with a first network and a second network, as shown in FIG. 2, and the method includes:

step 21: sending capability reference information of the terminal device to the first network and/or the second network; where the capability reference information is at least configured to assist a first network device of the first network and a second network device of the second network to allocate uplink time-domain resources for the terminal device; and step 22: acquiring an uplink time-domain resource configuration of the terminal device in the first network, and an uplink time-domain resource configuration of the terminal device in the second network.

Here, the terminal device is a device capable of establishing dual-connectivity (DC). The dual-connectivity may specifically be EN-DC, NE-DC or NGEN-DC. The EN-DC refers to dual-connectivity of a 4G radio access network and the 5G NR, the NE-DC refers to dual-connectivity between the 5G NR of the 4G radio access network, and the NGEN-DC refers to dual-connectivity of the 4G radio access network and the 5G NR in a 5G core network.

Accordingly, the first network and the second network are networks of different types, for example, the first network may be an LTE network, and the second network may be an NR network, or vice versa, which is not exhaustive here.

The first network device in the first network may be a base station in the first network, for example, may be a base station in the LTE network, and the second network device in the second network may be a base station in the second network, for example, may be a base station in the NR. Of course, based on different dual-connectivity scenarios, there are different first networks and second networks from the foregoing examples, and accordingly, both the first network device and the second network device may be base stations in respective networks, which are not described herein again.

Figure 3:
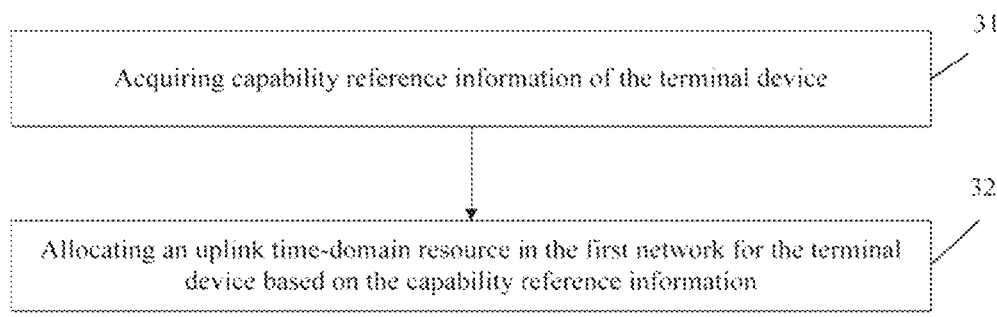
FIG. 3 is a second schematic flowchart of a resource configuration method according to an embodiment of the present application.

Corresponding to the processing of the foregoing terminal device, in a first network device of a first network, where the first network device establishes a connection with a terminal device, an embodiment of the present application provides a resource configuration method, which is applied to the first network device, as shown in FIG. 3, including:

step 31: acquiring capability reference information of the terminal device, where the terminal device is capable of establishing connections with the first network and a second network; and step 32: allocating an uplink time-domain resource in the first network for the terminal device based on the capability reference information.

Figure 4:
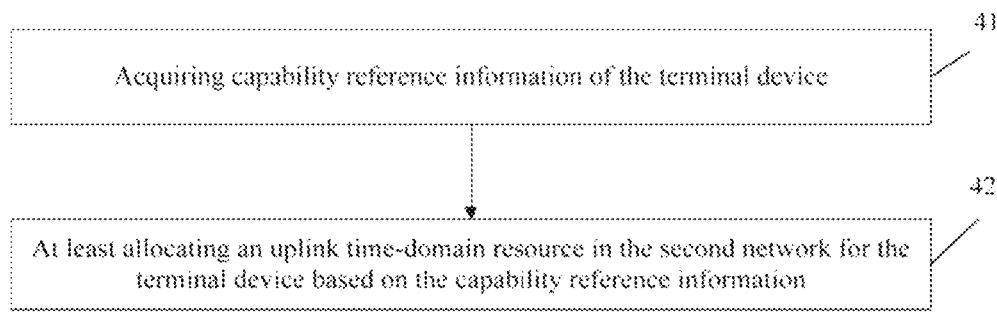
FIG. 4 is a third schematic flowchart of a resource configuration method according to an embodiment of the present application.

Corresponding to the processing of the foregoing terminal device, in a second network device of a second network, where the second network device establishes a connection with the terminal device, an embodiment of the present application provides a resource configuration method, which is applied to the second network device, as shown in FIG. 4, including:

step 41: acquiring capability reference information of the terminal device, where the terminal device is capable of establishing connections with a first network and the second network; and step 42: at least allocating an uplink time-domain resource in the second network for the terminal device based on the capability reference information.

Figure 5:
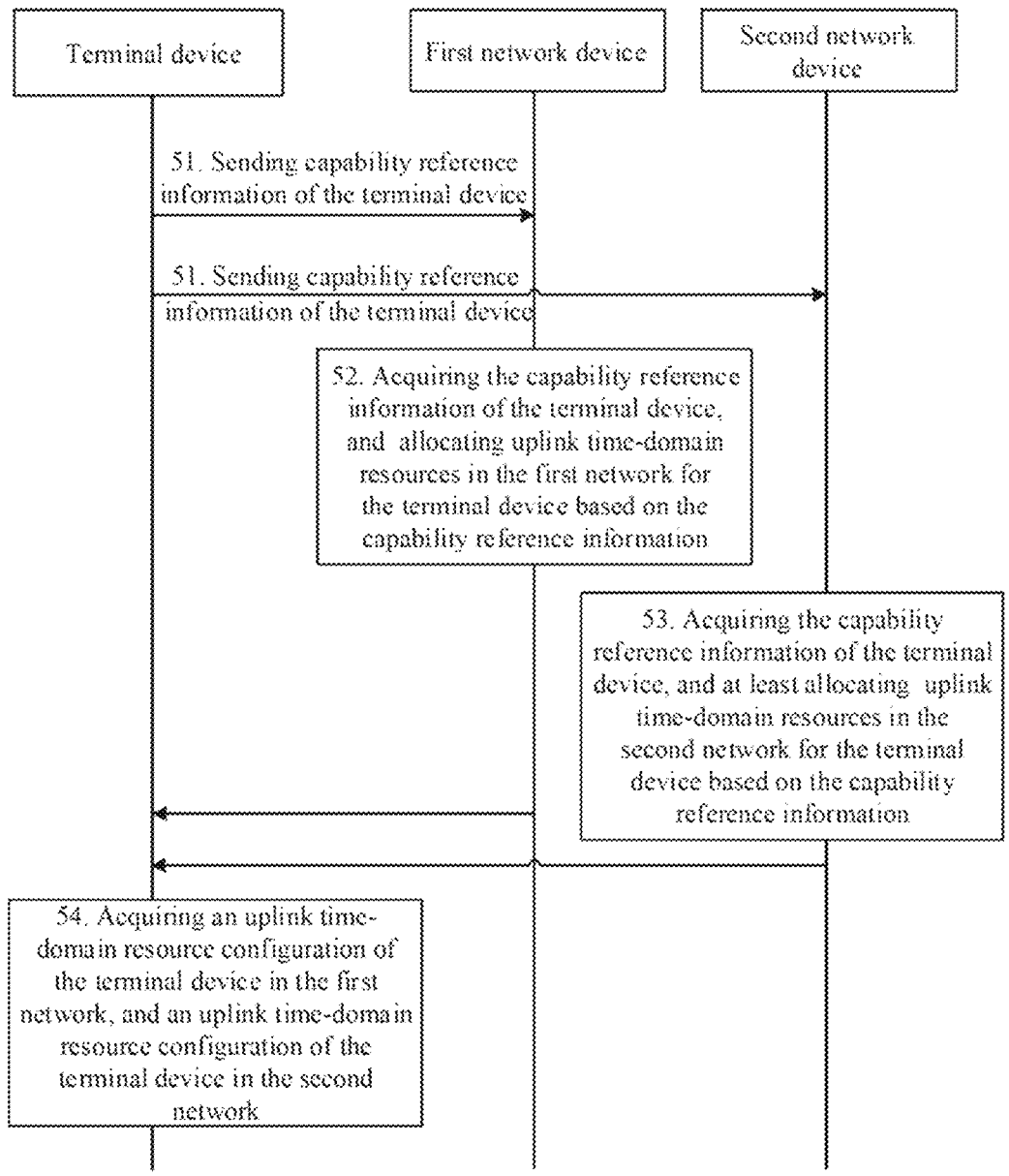
FIG. 5 is a fourth schematic flowchart of a resource configuration method according to an embodiment of the present application.

In general, with reference to FIG. 5, in a solution provided by the present embodiment, an interaction between a terminal device and two network devices may include:

step 51: sending capability reference information of the terminal device to a first network and/or a second network, and then step 52 and step 53 are executed; where the capability reference information is at least configured to assist a first network device of the first network and a second network device of the second network to allocate uplink time-domain resources for the terminal device;

step 52: the first network device acquires the capability reference information of the terminal device, where the terminal device is capable of establishing connections with the first network and the second network; and allocates an uplink time-domain resource in the first network for the terminal device based on the capability reference information, and then step 54 is executed;

step 53: the second network device acquires the capability reference information of the terminal device, where the terminal device is capable of establishing connections with the first network and the second network; and at least allocates an uplink time-domain resource in the second network for the terminal device based on the capability reference information, and then step 54 is executed; and step 54: acquiring an uplink time-domain resource configuration of the terminal device in the first network, and an uplink time-domain resource configuration of the terminal device in the second network.

Step 52 and step 53 are both executed after step 51 is executed, and step 52 and step 53 are not limited in sequence.

Here, it should be understood that, in step 51, when the terminal device sends the capability reference information of the terminal device, it may be sent to the first network device in the first network, such as a base station in the LTE; or it may be sent to the second network device in the second network, such as a base station in the NR. Or, it may be reported to the first network device and the second network device respectively, that is, be reported to the base station of the NR and the base station of the LTE respectively.

Correspondingly, when the first network device (such as the base station in the LTE) receives the capability reference information sent by the terminal device, the first network device may execute step 52. In addition, the capability reference information may be forwarded to the second network device (such as an NR base station) by the first network device, for example, referring to FIG. 7, and at this time, the second network device may execute step 53.

When only the second network device receives the capability reference information sent by the terminal device, the second network device executes step 53. In addition, the capability reference information may be forwarded to the first network device by the second network device, and step 52 is executed by the first network device. If two network devices receive the capability reference information sent by the terminal device simultaneously, subsequent processing may be directly performed based on the capability reference information.

Still further, in the foregoing step 54, the terminal device may receive the uplink time-domain resource configuration of the terminal device in the first network sent by the first network device, and receive the uplink time-domain resource configuration of the terminal device in the second network sent by the second network device respectively.

There may be other cases, for example, the terminal device receives, through the first network device, the uplink time-domain resource configuration of the terminal device in the first network, and the uplink time-domain resource configuration of the terminal device in the second network; or the terminal device receives, through the second network device, the uplink time-domain resource configuration of the terminal device in the first network, and the uplink time-domain resource configuration of the terminal device in the second network. The present embodiment is not exhaustive again.

Compared with the prior art, in the first network, for example, the appearance of a high-power terminal (26 dBm) in the LTE causes more and more attention to a problem of an SAR exceeding a standard, and compared with a common terminal (23 dBm), the transmission power thereof is higher, an SAR value is higher. In order to solve a problem that the SAR value of the high-power terminal in the LTE exceeds the standard, a method for limiting uplink and downlink time-slot ratios occurs, that is, in an existing LTE network, static uplink and downlink time-slot ratios are generally adopted, as shown in Table 1 below, by excluding configurations with sequence numbers 0 and 6 in uplink and downlink configurations that account for an uplink ratio of more than 50%, uplink transmission time of the terminal is limited to be less than 50%, which eliminates the problem of high SAR value caused by the high-power terminal to a certain extent.

TABLE 1

| Uplink and downlink configurations | Conversion cycles from downlink to uplink | Sub-frame numbers | | | | | | | | | |
|---|---|---|---|---|---|---|---|---|---|---|---|
| | | 0 | 1 | 2 | 3 | 4 | 5 | 6 | 7 | 8 | 9 |
| 0 (60%) | 5 ms | D | S | U | U | U | D | S | U | U | U |
| 1 (40%) | 5 ms | D | S | U | U | D | D | S | U | U | D |
| 2 (25%) | 5 ms | D | S | U | D | D | D | S | U | D | D |
| 3 (30%) | 10 ms | D | S | U | U | U | D | D | D | D | D |
| 4 (20%) | 10 ms | D | S | U | U | D | D | D | D | D | D |
| 5 (10%) | 10 ms | D | S | U | D | D | D | D | D | D | D |
| 6 (50%) | 5 ms | D | S | U | U | U | D | S | U | U | D |

The high-power terminal is also introduced in the NR, and standardization also attempts to solve the SAR problem in an LTE-like manner, but it is difficult to achieve consistency. The reason is that there are only 7 configurations for the uplink and downlink in the LTE and they are all static configurations, but the NR has more than 60 configurations (as shown in Table 2), and there are flexible symbols which may be configured as uplink or downlink in each configuration. This makes it very difficult to compute the uplink ratio in each uplink and downlink configuration.

TABLE 2

| | Symbol number in the time-slots | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | | | | | | | . . . | | | | | | | |
| 61 | D | D | X | X | X | X | U | D | D | X | X | X | X | U |
| 62-255 | | | | | | | Reserved | | | | | | | |

It can be seen that, in the prior art, it cannot be ensured that a time-domain resource configuration is performed for the terminal device effectively, so as to reduce radiation.

By the solution provided by the present embodiment, the terminal device can send the capability reference information to a network side to assist the network side to determine respective uplink time-domain resource configurations corresponding to two networks based on the capability reference information, thus, a determination of the uplink time-domain resources of the terminal device no longer depends on a terminal alone, instead, the uplink time-domain resources are jointly limited by two networks connected by the terminal device, that is, the uplink transmission time is controlled. In this way, an effect of reducing radiation can be achieved, and the uplink time-domain resources of the terminal device are configured by the two networks connected with the terminal device, thus, an uplink coverage can be ensured to a maximum extent.

Based on the foregoing solution, a plurality of scenarios are described below.

Scenario 1

For a dual-connectivity terminal device, for example, for an EN-DC terminal LTE FDD+NR TDD, when the maximum transmission power of the LTE FDD is 23 dBm and the maximum transmission power of the NR TDD is 23 dBm, a risk of the SAR exceeding the standard is large, since a 23 dBm terminal in current LTE FDD has no SAR margin, and an overall external radiation of the 23 dBm terminal increases after adding the NR TDD. In order to maintain a maximum transmission power capability for such terminals without exceeding an SAR standard, it is necessary to reduce transmission time of the LTE FDD (embodied as the decrease of an external average radiation), and meanwhile control transmission time of the NR TDD, and keep an overall average radiation below the SAR standard.

Description about the SAR: the SAR is an index parameter for measuring an intensity of human electromagnetic radiation by a terminal, and in order to avoid injury of the human body by an electromagnetic radiation device such as a mobile phone, there is a strict index requirement on the SAR value radiated by the mobile phone in standard, and the terminal cannot exceed a limit value. An SAR index is an average measurement value of the terminal within a period of time, and has characteristics that the higher the transmission power of the terminal is, the higher the SAR value is, and the longer the uplink transmission time is, the higher the SAR is.

Figure 6:
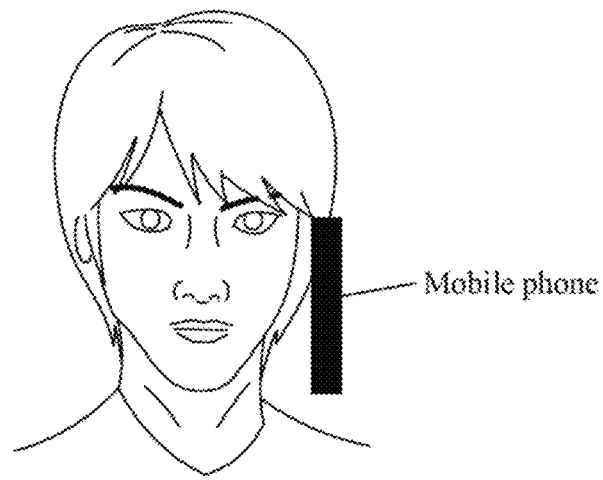
FIG. 6 is a scenario schematic diagram according to an embodiment of the present application.

For an inter-band EN-DC terminal, an LTE frequency band and an NR frequency band are different frequency bands, theoretically, external radiation efficiency thereof is different, and meanwhile, since a difference in distances between different parts of the terminal device, for example, the mobile phone, and the human body may also bring different effects of mobile phone radiation being absorbed by the human body, as shown in FIG. 6, it is supposed that there are antennas corresponding to two networks, one antenna is on the top and the other is on the bottom, thus the radiation on the top is more easily absorbed by the human body, that is, the SAR will be higher. Therefore, even if transmission power of the two networks, such as the LTE and the NR, are the same, SARs are different.

In the present scenario, the capability reference information of the terminal device includes:

a working frequency band combination of the terminal device in the first network and the second network, and one or more sets of maximum uplink transmission time ratio combinations corresponding to the working frequency band combination of the first network and the second network;

where each set of the maximum uplink transmission time ratio combinations includes a maximum uplink transmission time ratio of the first network and a maximum uplink transmission time ratio of the second network; and the maximum uplink transmission time ratio combinations of different sets include different maximum uplink transmission time ratios of the first network and/or different maximum uplink transmission time ratios of the second network.

Among them, in the working frequency band combination of the first network and the second network, a first working frequency band of the terminal device in the first network and a second working frequency band of the terminal device in the second network are included. The working frequency band combination reported in the capability reference information of the terminal device may have different combinations at different moments, and is specifically determined according to the working frequency bands currently used by the terminal device in the first network and the second network, which are not described herein again.

Figure 7:
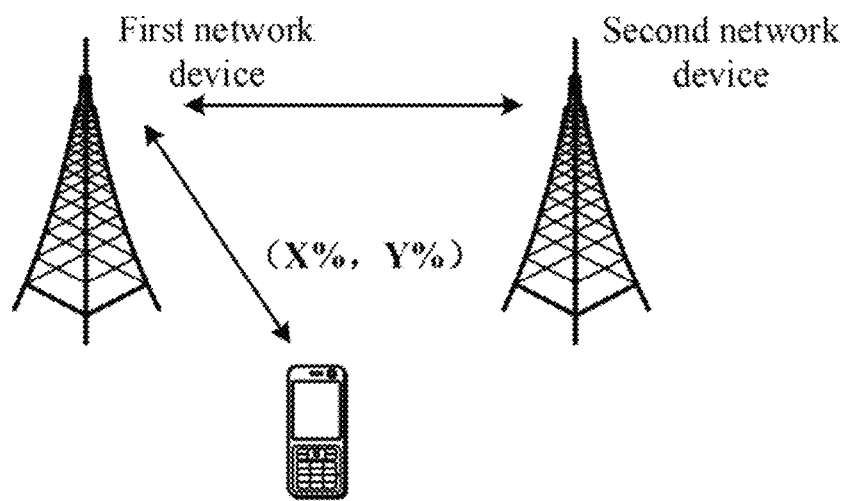
FIG. 7 is a first schematic diagram of a system processing scenario according to an embodiment of the present application.

For example, transmitting one set of maximum uplink transmission time ratio combination is taken as an example for description, for a specific frequency band combination with an LTE FDD Band X (namely, the first working frequency band in the first network)+an NR TDD Band Y (namely, the second working frequency band in the second network), a maximum uplink transmission time ratio of the LTE FDD is limited to x % (part of time-slots of the uplink cannot be transmitted, the downlink is normal), and meanwhile, a maximum uplink transmission time ratio of the NR TDD is limited to y %. As shown in FIG. 7, this time ratio combination is reported to the first network device of the first network and the second network device of the second network, for example, an LTE base station and the NR base station, that is, (LTE FDD Band X, NR TDD Band Y) corresponds to a maximum uplink transmission time ratio combination (x %, y %).

It should be pointed out that, the foregoing one or more sets of maximum uplink transmission time ratio combinations are obtained by testing at the maximum transmission power of a corresponding terminal. A specific determination method may include:
  when a corresponding uplink transmission time ratio of the terminal device in the first network is a first value, determining a corresponded SAR margin in a condition that the terminal device adopts maximum transmission power in the first network;
  determining, based on the SAR margin, that a corresponding uplink transmission time ratio of the terminal device in the second network is a second value; and
  taking the first value and the second value as one set of maximum uplink transmission time ratio combinations.

It should be understood that, when different first values are set, different second values may be obtained, that is, for different sets of maximum uplink transmission time ratio combinations, different first values and second values are included; that is to say, when two sets of maximum uplink transmission time ratio combinations are sent, a first set of maximum uplink transmission time ratio combinations includes a first value A1 and a second value B1; and a second set of maximum uplink transmission time ratio combinations includes a first value A2 and a second value B2; where the first values A1 and A2 may be different, and the second values B1 and B2 may also be different.

For example, the terminal obtains the maximum uplink transmission time ratio combination (x %, y %) corresponding to the LTE FDD Band X and the NR TDD Band Y which are at the maximum transmission power at the same time through actual tests before leaving a factory. It may configure an LTE uplink ratio as a first value, namely, x %, for the terminal firstly, and then measure to obtain an SAR margin of the LTE at the maximum transmission power, for example, 23 dBm, and finally, test to obtain a second value, for example, y %, when the maximum uplink ratio of the terminal does not exceed the SAR margin at the maximum power, for example, 23 dBm, which is transmitted by the NR. Multiple sets of maximum uplink transmission time ratio combinations may include a plurality of combination values, for example:

(10%, $y_1$%), (20%, $y_2$%), (30%, $y_3$%), (40%, $y_4$%), (50%, $y_5$%), . . .

Of course, the method for obtaining the maximum uplink transmission time ratio combination (x %, y %) may also use a second power frequency band in the second network, for example, the NR TDD band, as a reference, which may specifically include:
  when a corresponding uplink transmission time ratio of the terminal device in the second network is a third value, determining a corresponded SAR margin in a condition that the terminal device adopts maximum transmission power in the second network;
  determining, based on the SAR margin, that a corresponding uplink transmission time ratio of the terminal device in the first network is a fourth value; and
  taking the third value and the fourth value as one set of maximum uplink transmission time ratio combinations.

Similarly, when different third values are set, different fourth values may be obtained, that is, when multiple sets of maximum uplink transmission time ratio combinations are obtained, different third values and fourth values are included in different sets of maximum uplink transmission time ratio combinations.

For example, for a test of the terminal device, an uplink ratio of the second network, such as the NR, is set firstly, and then an SAR margin is obtained, and further a maximum uplink ratio of the first network, such as the LTE, is obtained. Finally, multiple sets of maximum uplink transmission time ratio combinations that can be obtained are:

($x_1$%, 10%), ($x_2$%, 20%), ($x_3$%, 30%), ($x_4$%, 40%), ($x_5$%, 50%), . . .

In the present embodiment, the terminal device can report one or more maximum uplink transmission time ratio combination values to a base station when accessing a network. Here, it should be understood that, when the terminal device reports one or more sets of maximum uplink transmission time ratio combination values, it may be reported to the first network device in the first network, such as a base station in the LTE; or, it may be reported to the second network device in the second network, such as a base station in the NR. Or, it may be reported to the first network device and the second network device respectively, that is, be reported to the base station of the NR and the base station of the LTE respectively.

Correspondingly, when only the first network device (such as the base station in the LTE) receives the capability reference information sent by the terminal device, the capability reference information may be forwarded to the second network device (such as the NR base station) by the first network device, for example, referring to FIG. 7. When only the second network device receives the capability reference information sent by the terminal device, the capability reference information may be forwarded to the first network device by the second network device. If two network devices receive the capability reference information sent by the terminal device simultaneously, subsequent processing may be directly performed based on the capability reference information.

Processing manners at the network side are different for processing the capability reference information in which one and multiple sets of maximum uplink transmission time ratio combinations are included.

A first processing manner: one set of maximum uplink transmission time ratio combinations is included in the capability reference information.

In the first network device, the allocating the uplink time-domain resource in the first network for the terminal device based on the capability reference information includes:

configuring a static or semi-static uplink transmission mode for the terminal device based on the maximum uplink transmission time ratio of the first network in the maximum uplink transmission time ratio combination.

In the second network device, the at least allocating the uplink time-domain resource in the second network for the terminal device based on the capability reference information includes:

scheduling uplink and downlink symbols for the terminal device based on the maximum uplink transmission time ratio of the second network in the maximum uplink transmission time ratio combination.

That is to say, the first network device allocates, according to the maximum uplink transmission time ratio of the first network in the capability reference information, and the second network device allocates, according to the maximum uplink transmission time ratio of the second network in the capability reference information, corresponding resources to the terminal device respectively.

For example, when the terminal reports only one ratio combination, and the LTE and NR base stations schedule this EN-DC terminal, the uplink transmission time ratio of the LTE should not be higher than x %, and the uplink transmission time ratio of the NR should not be higher than y %.

Figure 8:
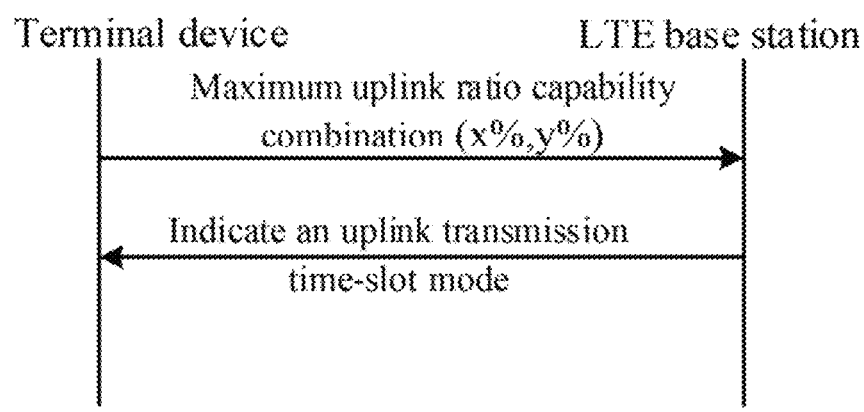
FIG. 8 is a schematic flowchart of acquiring an uplink transmission time-slot mode according to an embodiment of the present application.
Figure 9:
FIG. 9 is a schematic diagram of an uplink carrier time-slot configuration mode according to an embodiment of the present application.
Figure 9:

With regard to a manner of allocating corresponding resources, the first network is the LTE is taken as an example, reference is made to FIG. 8 and FIG. 9 for detailed description, after receiving this maximum uplink ratio capability combination, the LTE base station configures a static or semi-static uplink transmission mode for the terminal device according to an LTE uplink ratio capability x %, that is, indicates an uplink transmission mode for the terminal device, where the uplink transmission mode may be constituted by transmission time-slots and non-transmission time-slots of an FDD uplink carrier, as shown in FIG. 9, where the time-slots in white of the uplink carrier are available time-slots for transmission, and a gray time-slot is a time-slot that cannot be transmitted.

The second network is the NR is taken as an example, after receiving the maximum uplink ratio capability combination of a terminal, a base station at an NR side limits the scheduling of uplink symbols according to an NR uplink ratio capability y %. Since the base station may configure the uplink and downlink of the terminal in units of symbols at the NR side, it may be relatively flexible, so long as the base station ensures that an average uplink ratio in a certain time (for example, 1 s) does not exceed y %.

A second processing manner: multiple sets of maximum uplink transmission time ratio combinations are included in the capability reference information.

In the first network device, the allocating the uplink time-domain resource in the first network for the terminal device based on the capability reference information includes:

determining a corresponding target maximum uplink transmission time ratio combination based on an uplink ratio of the terminal device in the second network; and configuring a static or semi-static uplink transmission mode for the terminal device based on the maximum uplink transmission time ratio of the first network in the target maximum uplink transmission time ratio combination.

In the second network device, the at least allocating the uplink time-domain resource in the first network for the terminal device based on the capability reference information includes:

determining a corresponding target maximum uplink transmission time ratio combination based on an uplink ratio of the terminal device in the first network; and scheduling uplink and downlink symbols for the terminal device based on the maximum uplink transmission time ratio of the second network in the target maximum uplink transmission time ratio combination.

That is to say, when there are multiple sets of maximum uplink transmission time ratio combinations, the first network device needs to acquire the uplink ratio (that is an uplink ratio of the second network adopted by the terminal device actually) allocated by the second network device, and further determines, according to the uplink ratio allocated by the second network device to the terminal device, the corresponding target uplink ratio combination. Based on a maximum uplink ratio value corresponding to the first network included in the target uplink ratio combination, the first network device determines that the uplink ratio allocated to the terminal device needs to be lower than the maximum uplink ratio value.

When the second network device performs processing, the second network device needs to acquire the uplink ratio allocated by the first network device to the terminal device, and further determine a corresponding target uplink ratio combination. Based on a maximum uplink ratio value corresponding to the second network included in the target uplink ratio combination, the second network device determines that the uplink ratio allocated to the terminal device needs to be less than the maximum uplink ratio value corresponding to the second network.

For example, when the terminal reports multiple ratio combinations, uplink ratio configurations of the LTE and the NR should be at least less than or equal to one ratio combination value reported by the terminal at the same time. Referring to the foregoing examples of the multiple ratio combinations, if an LTE uplink ratio is between 20% and 30%, the uplink ratio of the NR should be lower than $y_3$%.

Similarly, the first network is the LTE is taken as an example, reference is made to FIG. 8 and FIG. 9 for detailed description, after receiving the maximum uplink ratio capability combination, the LTE base station configures a static or semi-static uplink transmission mode for the terminal device according to an LTE uplink ratio capability x %, that is, indicates an uplink transmission mode for the terminal device, where the mode may be constituted by transmission time-slots and non-transmission time-slots of the FDD uplink carrier, as shown in FIG. 9, where the time-slots in white of the uplink carrier are available time-slots for transmission, and a gray time-slot is a time-slot that cannot be transmitted.

The second network is the NR is taken as an example, after receiving the maximum uplink ratio capability combination of the terminal, the base station at an NR side limits the scheduling of uplink symbols according to an NR uplink ratio capability y %. Since the base station may configure the uplink and downlink of the terminal in units of symbols at the NR side, it may be relatively flexible, so long as the base station ensures that an average uplink ratio in a certain time (for example, 1s) does not exceed y %.

By adopting scenario 1, it can be ensured that the terminal device connected to two networks satisfies that the SAR index does not exceed the standard, and at the same time, the terminal device can achieve the maximum transmission power capability under the two networks, thereby ensuring the uplink coverage. Furthermore, in the present scenario, the terminal is allowed to report multiple maximum uplink ratio capability combinations, and an appropriate uplink transmission time-slot configuration is selected by the base station according to actual service requirements, which is very flexible.

Scenario 2: a difference from scenario 1 lies in that, the present scenario adds different transmission power which may correspond to different maximum uplink transmission time ratio combinations. The following two sub-scenarios are specifically described.

Sub-Scenario 21

The capability reference information of the terminal device includes:
- a working frequency band combination of the terminal device in the first network and the second network; and
- at least one set of maximum uplink transmission time ratio combinations corresponding to different first transmission power in a condition that the terminal device is under at least one first transmission power in the first network;
- where each set of the maximum uplink transmission time ratio combinations includes a maximum uplink transmission time ratio of the first network and a maximum uplink transmission time ratio of the second network; and the maximum uplink transmission time ration combinations of different sets include different maximum uplink transmission time ratios of the first network and/or different maximum uplink transmission time ratios of the second network.

For example, when the first network is the LTE and the second network is the NR, for a high-power terminal with the LTE FDD Band X+NR TDD Band Y, the terminal reports maximum uplink ratio combination values corresponding to different LTE power when accessing initially, as shown in Table 3.

TABLE 3

| Transmission power Px of the LTE FDD | Maximum uplink ratio capability combination ( x % , y % ) of the LTE + NR |
|---|---|
| 23 dBm | (10%, $y_{11}$%), (20%, $y_{21}$%), (30%, $y_{31}$%), (40%, $y_{41}$%), (50%, $y_{51}$%), . . . |
| 22 dBm | (10%, $y_{12}$%), (20%, $y_{22}$%), (30%, $y_{32}$%), (40%, $y_{42}$%), (50%, $y_{52}$%), . . . |
| 21 dBm | (10%, $y_{13}$%), (20%, $y_{23}$%), (30%, $y_{33}$%), (40%, $y_{43}$%), (50%, $y_{53}$%), . . . |
| 20 dBm | (10%, $y_{14}$%), (20%, $y_{24}$%), (30%, $y_{34}$%), ( 40%, $y_{44}$%), (50%, $y_{54}$%), . . . |

The numerical values in the above Table 3 is obtained by a test before the terminal leaves the factory. The transmission power of the NR in the test remains at a maximum of 23 dBm, and the transmission power of the LTE may be adjusted to 23 dBm, 22 dBm, 21 dBm, 20 dBm, etc. In each power combination, the transmission time-slot ratio of the LTE is set to 10%, 20% . . . etc. The maximum uplink ratio $y_1$%, $y_2$% . . . of the NR when the SAR does not exceed the standard is obtained by the test. For a specific determination method, reference may be made to scenario 1, which is not described herein again.

Correspondingly, the processing of the first network device, such as an LTE base station side, may include:

selecting, based on an average transmission power of the terminal device in the first network within a first preset duration, a target maximum uplink transmission time ratio combination from at least one set of maximum uplink transmission time ratio combinations corresponding to different first transmission power; and determining, based on the target maximum uplink transmission time ratio combination, an uplink transmission time ratio adopted by the terminal device in the first network; where the uplink transmission time ratio adopted by the terminal device in the first network is less than or equal to a maximum uplink transmission time ratio of the first network in the target maximum uplink transmission time ratio combination. The first preset duration may be set according to actual cases, for example, it may be 1 minute, or it may be 3 minutes, of course, it may also be 30 seconds, or other durations, which is not exhaustive here.

On this basis, the first network device may also perform one of the following processing:
- determining, based on the target maximum uplink transmission time ratio combination, the maximum uplink transmission time ratio of the terminal device in the second network;
- determining, based on the target maximum uplink transmission time ratio combination, the maximum uplink transmission time ratio of the terminal device in the second network, and sending the maximum uplink transmission time ratio of the terminal device in the second network to the second network device; and
- sending the uplink transmission time ratio adopted by the terminal device in the first network to the second network device.

That is to say, in such a sub-scenario, the first network device may determine, according to the average transmission power within the first preset duration, the maximum uplink transmission time ratio combination that can be selected by itself, and then determine, based on the selected target maximum uplink transmission time ratio combination, the maximum uplink transmission time ratio of the terminal device in the first network; determine a value less than or equal to the maximum uplink transmission time ratio in the first network as the uplink transmission time ratio adopted by the terminal device in the first network. In addition, based on the uplink transmission ratio adopted by the terminal device in the first network, the static or semi-static uplink transmission mode is configured for the terminal device.

Further, when the first network device has determined the uplink transmission time ratio adopted by itself, it may notify the second network device of the adopted uplink transmission time ratio thereof, thus, the second network device can determine and select, according to the uplink transmission time ratio adopted by the terminal device in the first network, a maximum uplink transmission time ratio usable by the terminal device in the second network, and then determine an uplink transmission time ratio which is finally adopted by the terminal device in the second network.

Specifically, the at least allocating, by the second network device, the uplink time-domain resource in the second network for the terminal device based on the capability reference information may include:

selecting, based on an average transmission power of the terminal device in the first network within a first preset duration and the uplink transmission ratio adopted by the terminal device in the first network, a target maximum uplink transmission time ratio combination from at least one set of maximum uplink transmission time ratio combinations corresponding to different first transmission power; determining, based on the target maximum uplink transmission time ratio combination, an uplink transmission ratio adopted by the terminal device in the second network; and scheduling uplink and downlink symbols for the terminal device based on the uplink transmission ratio adopted by the terminal device in the second network. The uplink transmission ratio adopted by the terminal device in the second network is less than a maximum uplink transmission time ratio of the second network in the target maximum uplink transmission time ratio combination.

Or, the first network device can directly determine the maximum uplink transmission time ratio adoptable by the terminal device in the second network, and send the information to the second network device. Correspondingly, the second network device can determine, according to the maximum uplink transmission time ratio adoptable by the terminal device in the second network sent by the first network device, the uplink transmission time ratio adopted by the terminal device in the second network, and schedule uplink and downlink symbols for the terminal device based on the uplink transmission ratio adopted by the terminal device in the second network.

For example, the first network device in the first network, such as the LTE base station, configures, according to a received maximum uplink ratio capability combination at transmission power of 23 dBm in the LTE FDD, an LTE FDD uplink carrier transmission time-slot pattern. Correspondingly, the maximum uplink ratio capability configurable by the NR can be obtained. For example, if an uplink ratio configured by the LTE FDD is between 20% and 30%, an initial maximum uplink ratio configurable at the NR side is $y_{31}\%$ in the first row of Table 1.

When the average transmission power of the LTE decreases within a preset duration (for example, 1 minute), an uplink ratio configurable by the NR side increases accordingly. For example, when the transmission power of the LTE FDD is decreased to 21 dBm and the transmission time-slot pattern of the uplink carrier is unchanged, the maximum uplink ratio of the NR corresponds to $y_{33}\%$. In this way, the uplink time-slot usable by the NR side increases correspondingly, and uplink throughput is improved.

Sub-Scenario 22

A difference from the sub-scenario 21 lies in that, the present sub-scenario performs processing by taking the transmission power corresponding to the terminal device in the second network as a reference, and the detailed description is as follows.

The capability reference information of the terminal device includes:
 a working frequency band combination of the terminal device in the first network and the second network; and
 at least one set of maximum uplink transmission time ratio combinations corresponding to different second transmission power in a condition that the terminal device is under at least one second transmission power in the second network;
 where each set of the maximum uplink transmission time ratio combinations includes a maximum uplink transmission time ratio of the first network and a maximum uplink transmission time ratio of the second network; and the maximum uplink transmission time ratio combinations of different sets include different maximum uplink transmission time ratios of the first network and/or different maximum uplink transmission time ratios of the second network.

For example, when the first network is the LTE and the second network is the NR, for the high-power terminal with the LTE FDD Band X+NR TDD Band Y, the terminal reports maximum uplink ratio combination values corresponding to different NR power when accessing initially, as shown in Table 4.

TABLE 4

| Transmission power Py of the NR TDD | Maximum uplink ratio capability combination (x %, y %) of the LTE + NR |
|---|---|
| 23 dBm | ($x_{11}\%$, 10%), ($x_{21}\%$, 20%), ($x_{31}\%$, 30%), ($x_{41}\%$, 40%), ($x_{51}\%$, 50%), . . . |
| 22 dBm | ($x_{12}\%$, 10%), ($x_{22}\%$, 20%), ($x_{32}\%$, 30%), ($x_{42}\%$, 40%), ($x_{52}\%$, 50%), . . . |
| 21 dBm | ($x_{13}\%$, 10%), ($x_{23}\%$, 20%), ($x_{33}\%$, 30%), ($x_{43}\%$, 40%), ($x_{53}\%$, 50%), . . . |
| 20 dBm | ($x_{14}\%$, 10%), ($x_{24}\%$, 20%), ($x_{34}\%$, 30%), ($x_{44}\%$, 40%), ($x_{54}\%$, 50%), . . . |

The numerical values in the above Table 4 is obtained by a test before the terminal leaves the factory. The transmission power of the LTE in the test remains at a maximum of 23 dBm, and the transmission power of the NR may be adjusted to 23 dBm, 22 dBm, 21 dBm, 20 dBm, etc. In each power combination, the transmission time-slot ratio of the NR is set to 10%, 20% . . . etc. The maximum uplink ratio $y_1\%$, $y_2\%$ . . . of the LTE when the SAR does not exceed the standard is obtained by the test.

Correspondingly, the processing of the second network device, such as an NR base station side, may include:
 selecting, based on an average transmission power of the terminal device in the second network within a second preset duration, a target maximum uplink transmission time ratio combination from at least one set of maximum uplink transmission time ratio combinations corresponding to different second transmission power; and
 determining, based on the target maximum uplink transmission time ratio combination, an uplink transmission time ratio adopted in the second network; where the uplink transmission time ratio adopted by the terminal device in the second network is less than or equal to a maximum uplink transmission time ratio of the second network in the target maximum uplink transmission time ratio combination. The second preset duration may be set according to actual cases, for example, it may be 1 minute, or it may be 3 minutes, of course, it may also be 30 seconds, or other durations, which is not exhaustive here. The second preset duration in the present sub-scenario may be the same as or may be different from the first preset duration in the sub-scenario 21.

On this basis, the second network device may also perform one of the following processing:
 determining, based on the target maximum uplink transmission time ratio combination, the maximum uplink transmission time ratio of the terminal device in the first network;
 determining, based on the target maximum uplink transmission time ratio combination, the maximum uplink transmission time ratio of the terminal device in the first network, and sending the maximum uplink transmission time ratio of the terminal device in the first network to the first network device; and sending the uplink transmission time ratio adopted by the terminal device in the second network to the first network device.

That is to say, in such a sub-scenario, the second network device may determine, according to the average transmission power within the second preset duration, the maximum uplink transmission time ratio combination selectable by itself, and then determine, based on the selected target maximum uplink transmission time ratio combination, the maximum uplink transmission time ratio of the terminal device in the second network; determine a value less than or equal to the maximum uplink transmission time ratio in the second network as an uplink transmission time ratio adopted by the terminal device in the second network. Further, the uplink and downlink symbols are scheduled for the terminal device based on the uplink transmission ratio adopted by the terminal device in the second network.

Further, when the second network device has determined the uplink transmission time ratio adopted by itself, it may notify the first network device of the adopted uplink transmission time ratio thereof, specifically, in the first network device, the allocating the uplink time-domain resource in the first network for the terminal device based on the capability reference information may include:

selecting, based on an average transmission power of the terminal device in the second network within a second preset duration and the uplink transmission ratio adopted by the terminal device in the second network, a target maximum uplink transmission time ratio combination from at least one set of maximum uplink transmission time ratio combinations corresponding to different second transmission power;

determining, based on the target maximum uplink transmission time ratio combination, an uplink transmission ratio adopted by the terminal device in the first network; and configuring a static or semi-static uplink transmission mode for the terminal device based on the uplink transmission ratio adopted by the terminal device in the first network. Among them, the uplink transmission ratio adopted by the terminal device in the first network is less than a maximum uplink transmission time ratio of the first network in the target maximum uplink transmission time ratio combination.

Or, the second network device can directly determine the maximum uplink transmission time ratio adoptable by the terminal device in the first network, and send the information to the first network device. Correspondingly, the first network device can determine, according to the maximum uplink transmission time ratio adoptable by the terminal device in the first network sent by the second network device, the uplink transmission time ratio adopted by the terminal device in the first network, and schedule, based on the uplink transmission time ratio adopted by the terminal device in the first network, uplink and downlink symbols for the terminal device.

For example, the second network device, such as the NR base station, configures, according to a received maximum uplink ratio capability combination at an NR TDD transmission power of 23 dBm, an NR TDD uplink time-slot initially. Correspondingly, the maximum uplink ratio capability configurable by the LTE can be obtained. For example, an uplink ratio configured by the NR TDD is between 20% and 30%, then an initial maximum uplink ratio configurable at the LTE side is x31% (highlighting in yellow) in the first row of Table 1.

When the average transmission power of the NR decreases within a preset window (for example, 1 minute), an uplink ratio configurable by the LTE side increases accordingly. For example, when the transmission power of the NR TDD is decreased to 21 dBm and the uplink time-slot is unchanged, the maximum uplink ratio of the LTE corresponds to $y_{33}$%. In this way, the uplink time-slot usable by the LTE side increases correspondingly, and uplink throughput is improved.

In addition to beneficial effects mentioned in the scenario 1, the uplink ratio of the terminal device in the second network may be adjusted according to actual transmission power of the terminal device in the first network, thereby improving the uplink throughput of the NR. Or, an uplink carrier transmission time-slot configuration of the terminal device in the first network may be adjusted according to actual transmission power of the terminal device in the second network, thereby improving a utilization rate of an uplink carrier spectrum.

Scenario 3

The present scenario is different from the foregoing two scenarios, and the maximum uplink transmission ratio combination is no longer sent in the present scenario, but other restriction parameters are adopted to enable the network side to perform a computation to adjust a resource configuration, specifically:

for the inter-band EN-DC terminal, the first network, for example, the LTE frequency band, and the second network, for example, the NR frequency band, are different frequency bands, and theoretically, the efficiency of external radiation thereof is different, and even if the transmission power of the LTE and the NR are the same, the SARs thereof are different.

In the present scenario, the capability reference information of the terminal device includes:

a maximum uplink transmission time-slot ratio in a condition that the terminal device is under the maximum transmission power in the second network; and an SAR effect ratio of the terminal device at a working frequency band of the first network and a working frequency band of the second network under the same transmission power.

The terminal device may send the capability reference information to the first network device or the second network device, for example, for an EN-DC terminal device, the capability reference information may be sent to the first network device in the first network, that is, the LTE base station; for an NE-DC terminal device, the capability reference information may be sent to the second network device, such as the NR base station; and of course, vice versa, the present scenario is not exhaustive.

When the terminal device sends the capability reference information to the first network device, the processing executable by the first network device is as follows.

The allocating the uplink time-domain resource in the first network for the terminal device based on the capability reference information includes:

computing, based on the maximum uplink transmission time-slot ratio and the SAR effect ratio, to obtain an uplink transmission ratio corresponding to the first network and an uplink transmission ratio corresponding to the second network; and configuring an uplink transmission mode for the terminal device based on the uplink transmission ratio corresponding to the first network.

Among them, the method for computing to obtain the uplink transmission ratio corresponding to the first network and the uplink transmission ratio corresponding to the second network may be computing the uplink transmission ratio corresponding to the first network and the uplink transmission ratio corresponding to the second network based on the following inequality, the derivation thereof is as follows.

For example, it is supposed that, the first network, such as the LTE FDD carrier, an actual scheduled uplink transmission time-slot ratio is x %, and the second network, such as the NR TDD carrier, an actual scheduled uplink time-slot ratio is y %; the maximum uplink transmission time-slot ratio of an NR TDD carrier at 26 dBm is z %; and the SAR effect ratio of an LTE FDD carrier and the NR TDD carrier at the same power is SAR LTE FDD/SAR NR TDD=f.

Then, in any case, the terminal should satisfy the following inequality:

$$f*x\%*P_{LTE}/P_{26\ dBm}+y\%*P_{NR}/P_{26\ dBm} \leq z\%;$$

where $P_{LTE}$ and the $P_{NR}$ are linear values of maximum transmission power capabilities of the LTE FDD carrier and the NR TDD carrier under the EN-DC, and $P_{26\ dBm}$ is a linear power value at 26 dBm.

Among them, the value of f is determined according to actual cases, for example, in some cases, the value off may be 1 to simplify an operation.

If the NR TDD carrier does not support the transmission power of 26 dBm, z % may be set to a specific value, for example, 50%.

When $P_{LTE}$ and $P_{NR}$ correspond to the transmission power of 23 dBm respectively, $P_{LTE}/P_{26\ dBm}$ is equal to ½, and the inequality may be simplified as:

$$f*x\%+y\% \leq z\%*2.$$

Figure 10:
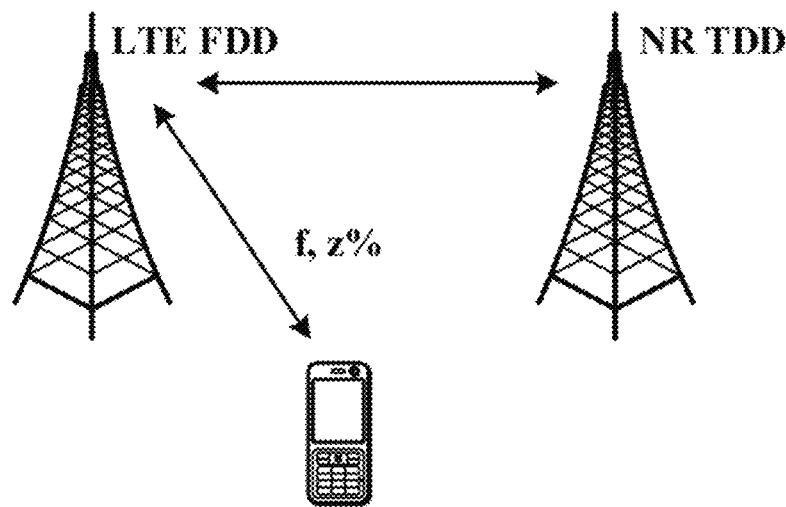
FIG. 10 is a second schematic diagram of a system processing scenario according to an embodiment of the present application.

In this case, supposing that the first network is LTE frequency division duplex (FDD, Frequency division duplex), and the second network is NR time division duplex (TDD, Time division duplex), referring to FIG. 10, when accessing a network, the terminal reports the above SAR effect ratio f of an LTE FDD frequency band and an NR TDD frequency band at the same transmission power and a maximum uplink transmission time-slot ratio capability z % of the NR TDD at 26 dBm to the first network device, i.e. the LTE base station. After receiving the two parameters, the first network device, for example, the LTE base station, needs to ensure that the above inequality is always established in subsequent scheduling. That is, the uplink transmission ratio corresponding to the first network and the uplink transmission ratio corresponding to the second network are computed according to the above inequality.

It should also be noted that, when the first network device computes to obtain the uplink transmission ratio corresponding to the first network, the uplink transmission mode may be configured for the terminal device based on this uplink transmission ratio.

In addition, the first network device may also send the uplink transmission ratio corresponding to the second network to the second network device, correspondingly, in this case, the second network device may schedule the uplink and downlink symbols for the terminal device according to the uplink transmission ratio corresponding to the second network sent by the first network device.

When the terminal device sends the capability reference information to the second network device, the processing executable by the second network device is as follows:

computing, based on the maximum uplink transmission time-slot ratio and the SAR effect ratio, to obtain an uplink transmission ratio corresponding to the first network and an uplink transmission ratio corresponding to the second network; and scheduling uplink and downlink symbols for the terminal device based on the uplink transmission ratio corresponding to the second network.

The method for computing to obtain the uplink transmission ratio corresponding to the first network and the uplink transmission ratio corresponding to the second network is the same as the foregoing, which is not described here again.

It should also be noted that, when the second network device computes to obtain the above uplink transmission ratio corresponding to the second network, the uplink and downlink symbols may be scheduled for the terminal device based on this uplink transmission ratio.

In addition, the second network device may also send the uplink transmission ratio corresponding to the first network to the first network device, correspondingly, in this case, the first network device may configure the uplink transmission mode for the terminal device according to the uplink transmission ratio corresponding to the first network sent by the second network device.

The above SAR effect ratio f of the terminal at the working frequency band of the first network and the working frequency band of the second network under the same transmission power may be different for different LTE+NR frequency band combinations, and a maximum uplink transmission time-slot ratio capability z % may be different for different NR frequency bands. The f and z % may be obtained by the test before the terminal leaves the factory. The transmission power of the LTE and the NR transmission power are maintained at 23 dBm when f is tested, and the transmission power of the NR is maintained at 26 dBm when z % is tested.

In another case, in the present scenario, the capability reference information of the terminal device includes:

an SAR effect ratio of the terminal device at a working frequency band of the first network and a working frequency band of the second network under the same transmission power.

The terminal device may send the capability reference information to the first network device and/or to the second network device, for example, for an EN-DC terminal device, the capability reference information may be sent to the first network device in the first network, that is, the LTE base station; for an NE-DC terminal device, the capability reference information may be sent to the second network device, such as the NR base station; and of course, vice versa, the present scenario is not exhaustive.

When the terminal device sends the capability reference information to the first network device, the processing executable by the first network device is as follows.

The allocating the uplink time-domain resource in the first network for the terminal device based on the capability reference information includes:

converting, based on the SAR effect ratio, an SAR effect of the terminal device at a frequency band of the second network to a frequency band of the first network to obtain the converted SAR effect corresponding to the second network;

determining, based on an SAR effect of the first network and the converted SAR effect corresponding to the second network, an uplink transmission ratio corresponding to the first network and/or an uplink transmission ratio corresponding to the second network; and configuring an uplink transmission mode for the terminal device based on the uplink transmission ratio corresponding to the first network.

Among them, when the first network device computes to obtain the uplink transmission ratio corresponding to the second network, this uplink transmission ratio may be sent to the second network device, thus the second network device schedules the uplink and downlink symbols for the terminal device based on this uplink transmission ratio.

For example, it may be supposed that an uplink transmission time-slot ratio which satisfies an SAR requirement is 50% when an LTE FDD frequency band is at a transmission power of 26 dBm. Therefore, an SAR effect of an NR TDD frequency band may be converted into the LTE FDD frequency band and compared with an uplink ratio of 50%.

The uplink transmission ratio corresponding to the first network and the uplink transmission ratio corresponding to the second network are computed based on the following inequality:

$$x\% * P_{LTE}/P_{26\ dBm}\ (y\% * P_{NR}/P_{25\ dBm})/f \leq 50\%;$$

where x % is an uplink transmission time-slot ratio which is actually scheduled by the first network, y % is an actual scheduling uplink time-slot ratio of the second network carrier, $P_{LTE}$ and $P_{NR}$ are linear values of maximum transmission power capabilities of a frequency division duplex FDD carrier of the long term evolution LTE and a time division duplex TDD carrier of the new radio NR under the 4G radio access network and 5G radio access network dual-connectivity EN-DC, $P_{26\ dBm}$ is a linear power value at 26 dBm, and f is an SAR effect ratio.

It should be pointed out that, in some cases, a value off may be 1 to simplify an operation.

That is to say, when accessing the network, the terminal reports the above SAR effect ratio f of the LTE FDD frequency band and the NR TDD frequency band at the same transmission power to a base station. After receiving the two parameters, the base station needs to ensure that the above inequality is always established in subsequent scheduling.

The above f may be different for different LTE+NR frequency band combinations. The f may be obtained by the test before the terminal leaves the factory. The transmission power of the LTE and the NR transmission power are maintained at 23 dBm when f is tested.

In addition, the first network device may also send the uplink transmission ratio corresponding to the second network to the second network device, correspondingly, in this case, the second network device may schedule the uplink and downlink symbols for the terminal device according to the uplink transmission ratio corresponding to the second network sent by the first network device.

When the terminal device sends the capability reference information to the second network device, the processing executable by the second network device is as follows:

converting, based on the SAR effect ratio, an SAR effect of the terminal device at a frequency band of the second network to a frequency band of the first network to obtain the converted SAR effect corresponding to the second network;

determining, based on an SAR effect of the first network and the converted SAR effect corresponding to the second network, an uplink transmission ratio corresponding to the first network and/or an uplink transmission ratio corresponding to the second network; and scheduling uplink and downlink symbols for the terminal device based on the uplink transmission ratio corresponding to the second network.

Among them, when the second network device computes to obtain the uplink transmission ratio corresponding to the first network, this uplink transmission ratio may be sent to the first network device, thus the first network device configures the uplink transmission mode for the terminal device based on the uplink transmission ratio corresponding to the first network.

The method for computing the uplink transmission ratio corresponding to the first network and the uplink transmission ratio corresponding to the second network is the same as the foregoing, which is not described here again.

It should also be noted that, when the second network device computes to obtain the above uplink transmission ratio corresponding to the second network, the uplink and downlink symbols may be scheduled for the terminal device based on this uplink transmission ratio.

In the present scenario, SAR effects of the two networks can be equivalent, thereby simplifying the reporting of terminal capability, and meanwhile simplifying the scheduling algorithms of the network device. In addition, by taking a maximum uplink ratio capability of one of the networks at the maximum transmission power as a reference, it is determined to schedule uplink ratios of the two networks, which can simplify the whole SAR solving mechanism.

Figure 11:
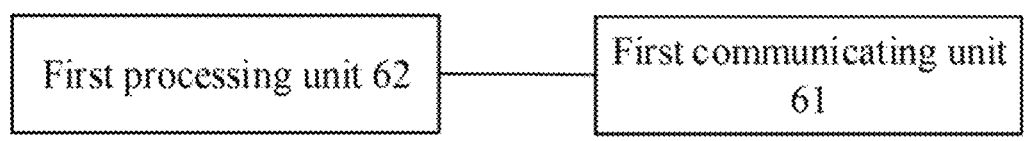
FIG. 11 is a schematic structural diagram of a terminal device composition according to an embodiment of the present application.

An embodiment of the present application provides a terminal device, as shown in FIG. 11, including:

a first communicating unit 61, which is capable of establishing connections with a first network and a second network, configured to send capability reference information of the terminal device to the first network and/or the second network; where the capability reference information is at least configured to assist a first network device of the first network and a second network device of the second network to allocate uplink time-domain resources for the terminal device; and acquire an uplink time-domain resource configuration of the terminal device in the first network, and an uplink time-domain resource configuration of the terminal device in the second network.

Figure 12:
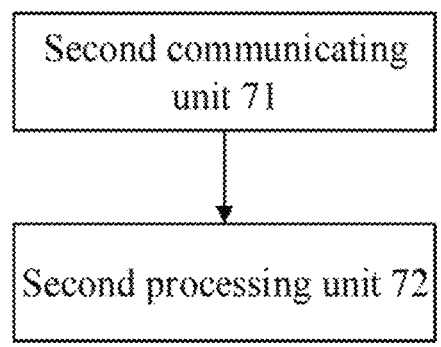
FIG. 12 is a first schematic structural diagram of a network device composition according to an embodiment of the present application.

An embodiment of the present application provides a first network device, as shown in FIG. 12, including:

a second communicating unit 71, configured to acquire capability reference information of the terminal device; where the terminal device is capable of establishing connections with a first network and a second network; and a second processing unit 72, configured to allocate an uplink time-domain resource in the first network for the terminal device based on the capability reference information.

Figure 13:
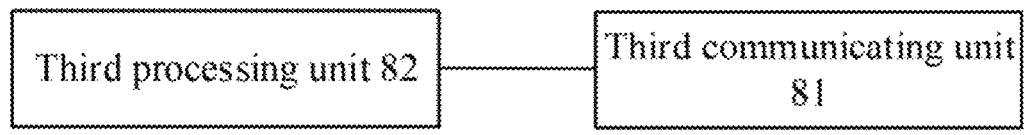
FIG. 13 is a second schematic structural diagram of a network device composition according to an embodiment of the present application.

An embodiment of the present application provides a second network device, as shown in FIG. 13, including:

a third communicating unit 81, configured to acquire capability reference information of the terminal device; where the terminal device is capable of establishing connections with a first network and a second network; and a third processing unit 82, configured to at least allocate an uplink time-domain resource in the second network for the terminal device based on the capability reference information.

In the solution provided by the present embodiment, the terminal device can send the capability reference information to a network side to assist the network side to determine respective uplink time-domain resource configurations corresponding to two networks based on the capability reference information, thus, a determination of the uplink time-domain resources of the terminal device no longer depends on a terminal, instead, the uplink time-domain resources are jointly limited by two networks connected by the terminal device, that is, the uplink transmission time is controlled. In this way, an effect of reducing radiation can be achieved, and the uplink time-domain resources of the terminal device are configured with the two networks connected by the terminal device, thus, an uplink coverage effect can be ensured to a maximum extent.

Based on the foregoing solution, a plurality of scenarios are described below.

Scenario 1

The capability reference information of the terminal device includes:
- a working frequency band combination of the terminal device in the first network and the second network, and one or more sets of maximum uplink transmission time ratio combinations corresponding to the working frequency band combination of the first network and the second network;
- where each set of the maximum uplink transmission time ratio combinations includes a maximum uplink transmission time ratio of the first network and a maximum uplink transmission time ratio of the second network; and the maximum uplink transmission time ratio combinations of different sets include different maximum uplink transmission time ratios of the first network and/or different maximum uplink transmission time ratios of the second network.

Among them, in the working frequency band combination of the first network and the second network, a first working frequency band of the terminal device in the first network and a second working frequency band of the terminal device in the second network are included. A working frequency band combination reported in the capability reference information of the terminal device may have different combinations at different moments, and is specifically determined according to working frequency bands currently used by the terminal device in the first network and the second network respectively, which are not described herein again.

For example, transmitting one set of maximum uplink transmission time ratio combination is taken as an example for description, for a specific frequency band combination with an LTE FDD Band X (namely, the first working frequency band in the first network)+an NR TDD Band Y (namely, the second working frequency band in the second network), a maximum uplink transmission time ratio of the LTE FDD is limited to x % (part of time-slots of the uplink cannot be transmitted, the downlink is normal), and meanwhile, a maximum uplink transmission time ratio of the NR TDD is limited to y %. As shown in FIG. 7, this time ratio combination is reported to the first network device of the first network and the second network device of the second network, for example, an LTE base station and the NR base station, that is, (LTE FDD Band X, NR TDD Band Y) corresponds to a maximum uplink transmission time ratio combination (x %, y %).

It should be pointed out that, the foregoing one or more sets of maximum uplink transmission time ratio combinations are obtained by testing at the maximum transmission power of a corresponding terminal. A specific determination method may be executed by the terminal device, and the terminal device further includes:
- a first processing unit 62, when a corresponding uplink transmission time ratio in the first network is a first value, configured to determine a corresponded SAR margin in a condition that maximum transmission power is adopted in the first network; determine, based on the SAR margin, that a corresponding uplink transmission time ratio in the second network is a second value; and take the first value and the second value as one set of maximum uplink transmission time ratio combinations.

Or, the first processing unit 62, when a corresponding uplink transmission time ratio in the second network is a third value, configured to determine a corresponded SAR margin in a condition that maximum transmission power is adopted in the second network; determine, based on the SAR margin, that a corresponding uplink transmission time ratio in the first network is a fourth value; and take the third value and the fourth value as one set of maximum uplink transmission time ratio combinations.

Processing manners at the network side are different for processing the capability reference information in which one and multiple sets of maximum uplink transmission time ratio combinations are included.

A first processing manner: one set of maximum uplink transmission time ratio combinations is included in the capability reference information.

In the first network device, the second processing unit is configured to configure a static or semi-static uplink transmission mode for the terminal device based on the maximum uplink transmission time ratio of the first network in the maximum uplink transmission time ratio combination.

In the second network device, the third processing unit is configured to schedule uplink and downlink symbols for the terminal device based on the maximum uplink transmission time ratio of the second network in the maximum uplink transmission time ratio combination.

A second processing manner: multiple sets of maximum uplink transmission time ratio combinations are included in the capability reference information.

In the first network device, the second processing unit is configured to determine a corresponding target maximum uplink transmission time ratio combination based on an uplink ratio of the terminal device in the second network; and
- configure a static or semi-static uplink transmission mode for the terminal device based on the maximum uplink transmission time ratio of the first network in the target maximum uplink transmission time ratio combination.

In the second network device, the third processing unit is configured to determine a corresponding target maximum uplink transmission time ratio combination based on an uplink ratio of the terminal device in the first network; and
- schedule uplink and downlink symbols for the terminal device based on the maximum uplink transmission time ratio of the second network in the target maximum uplink transmission time ratio combination, Scenario 2: a difference from scenario 1 lies in that, the present scenario adds different transmission power which may correspond to different maximum uplink transmission time ratio combinations. The following two sub-scenarios are specifically described.

Sub-Scenario 21

The capability reference information of the terminal device includes:
- a working frequency band combination of the terminal device in the first network and the second network; and
- at least one set of maximum uplink transmission time ratio combinations corresponding to different first transmission power in a condition that the terminal device is under at least one first transmission power in the first network;
- where each set of the maximum uplink transmission time ratio combinations includes a maximum uplink transmission time ratio of the first network and a maximum uplink transmission time ratio of the second network; and the maximum uplink transmission time ration combinations of different sets include different maximum uplink transmission time ratios of the first network and/or different maximum uplink transmission time ratios of the second network.

Correspondingly, the first network device, such as an LTE base station side, may include:
- the second processing unit 72, configured to select, based on an average transmission power of the terminal device in the first network within a first preset duration, a target maximum uplink transmission time ratio combination from at least one set of maximum uplink transmission time ratio combinations corresponding to different first transmission power; and determine, based on the target maximum uplink transmission time ratio combination, an uplink transmission time ratio adopted by the terminal device in the first network; where the uplink transmission time ratio adopted by the terminal device in the first network is less than or equal to a maximum uplink transmission time ratio of the first network in the target maximum uplink transmission time ratio combination. The first preset duration may be set according to actual cases, for example, it may be 1 minute, or it may be 3 minutes, of course, it may also be 30 seconds, or other durations, which is not exhaustive here.

Specifically, in the second network device, the at least allocating the uplink time-domain resource in the second network for the terminal device based on the capability reference information may include:
- the third processing unit 82, configured to select, based on an average transmission power of the terminal device in the first network within a first preset duration and the uplink transmission ratio adopted by the terminal device in the first network, a target maximum uplink transmission time ratio combination from at least one set of maximum uplink transmission time ratio combinations corresponding to different first transmission power; determine, based on the target maximum uplink transmission time ratio combination, an uplink transmission ratio adopted by the terminal device in the second network; and schedule uplink and downlink symbols for the terminal device based on the uplink transmission ratio adopted by the terminal device in the second network. Among them, the uplink transmission ratio adopted by the terminal device in the second network is less than a maximum uplink transmission time ratio of the second network in the target maximum uplink transmission time ratio combination.

Sub-Scenario 22

A difference from the sub-scenario 21 lies in that, the present sub-scenario performs processing by taking the transmission power corresponding to the terminal device in the second network as a reference, and the detailed description is as follows.

The capability reference information of the terminal device includes:
- a working frequency band combination of the terminal device in the first network and the second network; and
- at least one set of maximum uplink transmission time ratio combinations corresponding to different second transmission power in a condition that the terminal device is under at least one second transmission power in the second network;
- where each set of the maximum uplink transmission time ratio combinations includes a maximum uplink transmission time ratio of the first network and a maximum uplink transmission time ratio of the second network; and the maximum uplink transmission time ratio combinations of different sets include different maximum uplink transmission time ratios of the first network and/or different maximum uplink transmission time ratios of the second network.

The second network device, such as an NR base station side, may include:
- the third processing unit 82, configured to select, based on an average transmission power of the terminal device in the second network within a second preset duration, a target maximum uplink transmission time ratio combination from at least one set of maximum uplink transmission time ratio combinations corresponding to different second transmission power; and
- determine, based on the target maximum uplink transmission time ratio combination, an uplink transmission time ratio adopted in the second network; where the uplink transmission time ratio adopted by the terminal device in the second network is less than or equal to a maximum uplink transmission time ratio of the second network in the target maximum uplink transmission time ratio combination. The second preset duration may be set according to actual cases, for example, it may be 1 minute, or it may be 3 minutes, of course, it may also be 30 seconds, or other durations, which is not exhaustive here. The second preset duration in the present sub-scenario may be the same as or may be different from the first preset duration in the sub-scenario 21.

In the first network device, the second processing unit 72 is configured to select, based on an average transmission power of the terminal device in the second network within a second preset duration and the uplink transmission ratio adopted by the terminal device in the second network, a target maximum uplink transmission time ratio combination from at least one set of maximum uplink transmission time ratio combinations corresponding to different second transmission power;
- determine, based on the target maximum uplink transmission time ratio combination, an uplink transmission ratio adopted by the terminal device in the first network; and
- configure a static or semi-static uplink transmission mode for the terminal device based on the uplink transmission ratio adopted by the terminal device in the first network. Among them, the uplink transmission ratio adopted by the terminal device in the first network is less than a maximum uplink transmission time ratio of the first network in the target maximum uplink transmission time ratio combination.

Scenario 3

The present scenario is different from the foregoing two scenarios, and the maximum uplink transmission ratio combination is no longer sent in the present scenario, but other restriction parameters are adopted to enable the network side to perform a computation to adjust a resource configuration, specifically:

in the present scenario, the capability reference information of the terminal device includes:
a maximum uplink transmission time-slot ratio in a condition that the terminal device is under the maximum transmission power in the second network; and
an SAR effect ratio of the terminal device at a working frequency band of the first network and a working frequency band of the second network under the same transmission power.

The terminal device may send the capability reference information to the first network device or the second network device, for example, for an EN-DC terminal device, the capability reference information may be sent to the first network device in the first network, that is, the LTE base station; for an NE-DC terminal device, the capability reference information may be sent to the second network device, such as the NR base station; and of course, vice versa, the present scenario is not exhaustive.

When the terminal device sends the capability reference information to the first network device, the processing executable by the first network device is as follows.

The second processing unit 72 is configured to compute, based on the maximum uplink transmission time-slot ratio and the SAR effect ratio, to obtain an uplink transmission ratio corresponding to the first network and an uplink transmission ratio corresponding to the second network; and
configure an uplink transmission mode for the terminal device based on the uplink transmission ratio corresponding to the first network.

Among them, the method for computing to obtain the uplink transmission ratio corresponding to the first network and the uplink transmission ratio corresponding to the second network may be that the second processing unit 72 is is configured to compute the uplink transmission ratio corresponding to the first network and the uplink transmission ratio corresponding to the second network based on the following inequality, the derivation thereof is as follows.

For example, it is supposed that, the first network, such as the LTE FDD carrier, an actual scheduled uplink transmission time-slot ratio is x %, and the second network, such as the NR TDD carrier, an actual scheduled uplink timeslot ratio is y %; the maximum uplink transmission time-slot ratio of an NR TDD carrier at 26 dBm is z %; and the SAR effect ratio of an LTE FDD carrier and the NR TDD carrier at the same power is SAR LTE FDD/SAR NR TDD=f.

Then, in any case, the terminal should satisfy the following inequality:

$$f*x\%*P_{LTE}/P_{26\ dBm}+y\%*P_{NR}/P_{26\ dBm} \leq z\%;$$

where $P_{LTE}$ and the $P_{NR}$ are linear values of maximum transmission power capabilities of the LTE FDD carrier and the NR TDD carrier under the EN-DC, and $P_{26\ dBm}$ is a linear power value at 26 dBm.

Among them, the value of f is determined according to actual cases, for example, in some cases, the value of f may be 1 to simplify an operation.

If the NR TDD carrier does not support the transmission power of 26 dBm, z % may be set to a specific value, for example, 50%.

When $P_{LTE}$ and $P_{NR}$ correspond to the transmission power of 23 dBm respectively, $P_{LTE}/P_{26\ dBm}$ is equal to ½, and the inequality may be simplified as:

$$f*x\%+y\% \leq z\%*2.$$

When the terminal device sends the capability reference information to the second network device, the processing executable by the second network device is as follows:

the third processing unit 82 is configured to compute, based on the maximum uplink transmission time-slot ratio and the SAR effect ratio, to obtain an uplink transmission ratio corresponding to the first network and an uplink transmission ratio corresponding to the second network; and
schedule uplink and downlink symbols for the terminal device based on the uplink transmission ratio corresponding to the second network.

It should be pointed out that, the processing executed by each function unit of the network device and the terminal device is the same as the processing described in the foregoing method flows, and therefore the description thereof will not be repeated here.

In another case, in the present scenario, the capability reference information of the terminal device includes:
an SAR effect ratio of the terminal device at a working frequency band of the first network and a working frequency band of the second network under the same transmission power.

The terminal device may send the capability reference information to the first network device and/or to the second network device, for example, for an EN-DC terminal device, the capability reference information may be sent to the first network device in the first network, that is, the LTE base station; for an NE-DC terminal device, the capability reference information may be sent to the second network device, such as the NR base station; and of course, vice versa, the present scenario is not exhaustive.

When the terminal device sends the capability reference information to the first network device, the processing executable by the first network device is as follows.

The second processing unit 72 is configured to convert, based on the SAR effect ratio, an SAR effect of the terminal device at a frequency band of the second network to a frequency band of the first network to obtain the converted SAR effect corresponding to the second network;
determine, based on an SAR effect of the first network and the converted SAR effect corresponding to the second network, an uplink transmission ratio corresponding to the first network and/or an uplink transmission ratio corresponding to the second network; and
configure an uplink transmission mode for the terminal device based on the uplink transmission ratio corresponding to the first network.

For example, it may be supposed that an uplink transmission time-slot ratio which satisfies an SAR requirement is 50% when an LTE FDD frequency band is at a transmission power of 26 dBm. Therefore, an SAR effect of an NR TDD frequency band may be converted into the LTE FDD frequency band and compared with an uplink ratio of 50%.

The second processing unit 72 is configured to compute the uplink transmission ratio corresponding to the first network and the uplink transmission ratio corresponding to the second network based on the following inequality:

$$x\%*P_{LTE}/P_{26\ dBm}\ (y\%*P_{NR}/P_{26\ dBm})/f \leq 50\%;$$

where x % is an uplink transmission time-slot ratio which is actually scheduled by the first network, y % is an actual scheduling uplink time-slot ratio of the second network carrier, $P_{LTE}$ and $P_{NR}$ are linear values of maximum transmission power capabilities of a frequency division duplex FDD carrier of the long term evolution LTE and a time division duplex TDD carrier of the new radio NR under the 4G radio access network and 5G radio access network dual-connectivity EN-DC, $P_{26\ dBm}$ is a linear power value at 26 dBm, and f is an SAR effect ratio.

It should be pointed out that, in some cases, a value of f may be 1 to simplify an operation.

That is to say, when accessing the network, the terminal reports the above SAR effect ratio f of the LTE FDD frequency band and the NR TDD frequency band at the same transmission power to a base station. After receiving the two parameters, the base station needs to ensure that the above inequality is always established in subsequent scheduling.

The above f may be different for different LTE+NR frequency band combinations. The f may be obtained by the test before the terminal leaves the factory. The transmission power of the LTE and the NR transmission power are maintained at 23 dBm when f is tested.

In addition, the first network device may also send the uplink transmission ratio corresponding to the second network to the second network device, correspondingly, in this case, the second network device may schedule the uplink and downlink symbols for the terminal device according to the uplink transmission ratio corresponding to the second network sent by the first network device.

When the terminal device sends the capability reference information to the second network device, the processing executable by the second network device is as follows:

the third processing unit 82 is configured to convert, based on the SAR effect ratio, an SAR effect of the terminal device at a frequency band of the second network to a frequency band of the first network to obtain the converted SAR effect corresponding to the second network;

determine, based on an SAR effect of the first network and the converted SAR effect corresponding to the second network, an uplink transmission ratio corresponding to the first network and/or an uplink transmission ratio corresponding to the second network; and schedule uplink and downlink symbols for the terminal device based on the uplink transmission ratio corresponding to the second network.

The method for computing to obtain the uplink transmission ratio corresponding to the first network and the uplink transmission ratio corresponding to the second network is the same as the foregoing, which is not described here again.

It should also be noted that, when the second network device computes to obtain the uplink transmission ratio corresponding to the second network, the uplink and downlink symbols may be scheduled for the terminal device based on this uplink transmission ratio.

Figure 14:
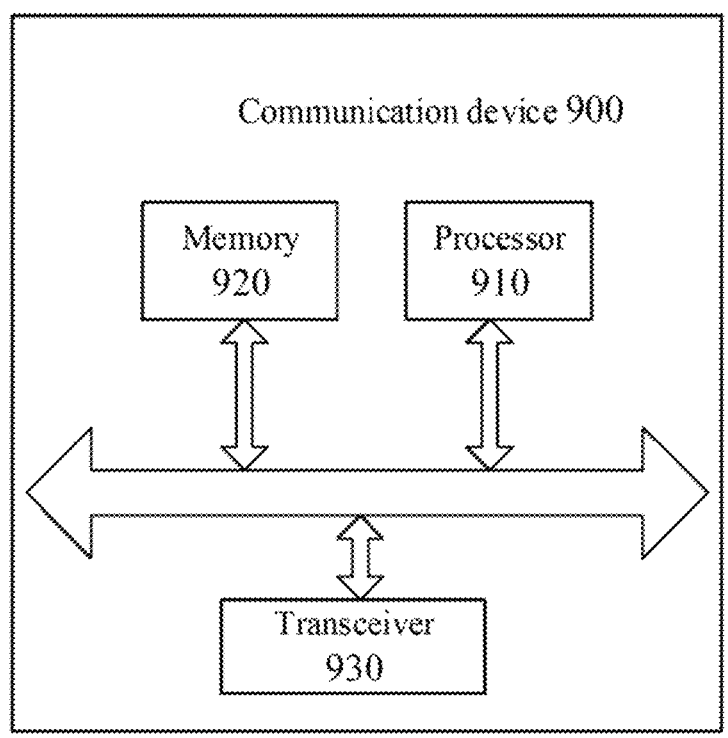
FIG. 14 is a schematic structural diagram of a communication device composition according to an embodiment of the present application.

FIG. 14 is a schematic structural diagram of a communication device 900 according to an embodiment of the present application, and the communication device may be the aforementioned UE or network device in the present embodiment. The communication device 900 as shown in FIG. 14 includes a processor 910, and the processor 910 may invoke and run a computer program from a memory to implement the method in the embodiments of the present application.

In an embodiment, as shown in FIG. 14, the communication device 900 may further include a memory 920, where the processor 910 may invoke and run the computer program from the memory 920 to implement the method in the embodiments of the present application.

Among them, the memory 920 may be a separate device which is independent of the processor 910, or may be integrated in the processor 910.

In an embodiment, as shown in FIG. 14, the communication device 900 may further include a transceiver 930, and the processor 910 may control the transceiver 930 to communicate with other devices. Specifically, information or data may be sent to other devices, or information or data sent by other devices can be received.

In an embodiment, the communication device 900 may specifically be a terminal device or a network device in the embodiments of the present application, and the communication device 900 may implement corresponding processes implemented by a mobile terminal/UE in various methods in the embodiments of the present application. It is not described herein for simplicity.

Figure 15:
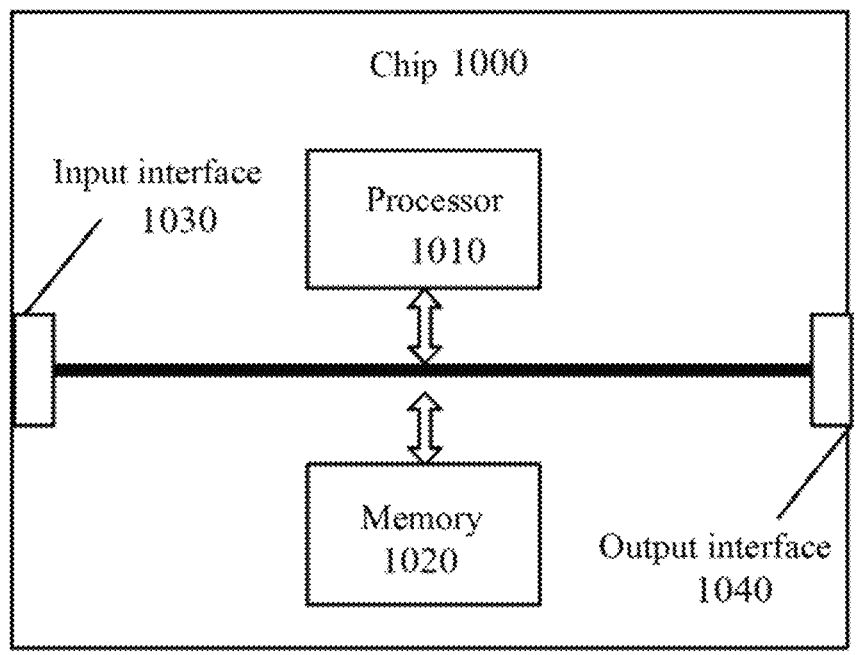
FIG. 15 is a schematic structural diagram of a chip according to an embodiment of the present application.

FIG. 15 is a schematic structural diagram of a chip according to an embodiment of the present application. The chip 1000 shown in FIG. 15 includes a processor 1010, and the processor 1010 may invoke and run a computer program from a memory to implement the method in the embodiments of the present application.

In an embodiment, as shown in FIG. 15, the chip 1000 may further include a memory 1020, where the processor 1010 may invoke and run the computer program from the memory 1020 to implement the method in the embodiment of the present application.

Among them, the memory 1020 may be a separate device which is independent of the processor 1010, or may be integrated in the processor 1010.

In an embodiment, the chip 1000 may further include an input interface 1030 and an output interface 1040.

In an embodiment, the chip may be applied to a network device/UE in the embodiments of the present application, and the chip may implement corresponding processes implemented by the network device/UE in various methods in the embodiments of the present application. It is not described herein for simplicity.

Figure 16:
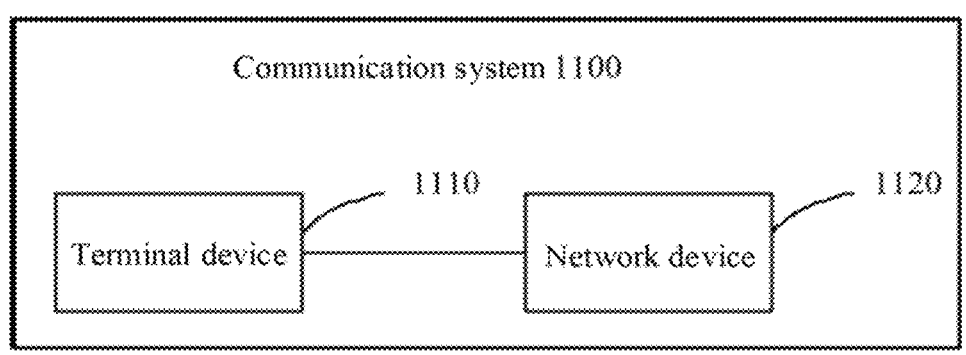
FIG. 16 is a second schematic diagram of a communication system architecture according to an embodiment of the present application.

FIG. 16 is a schematic diagram of a communication system provided by an embodiment of the present application. As shown in FIG. 16, the communication system includes a terminal device 1110 and a network device 1120.

Among them, the terminal device 1110 may be configured to implement corresponding functions implemented by the UE in the above method, and the network device 1120 may be configured to implement corresponding functions implemented by the network device in the above method. It is not described herein for simplicity.

It should be understood that, the processor in the embodiments of the present application may be an integrated circuit chip having a capability of signal processing. In an implementation process, each step of the foregoing method embodiments may be completed by an integrated logic circuit of hardware or an instruction in a form of software in the processor. The processor may be a general processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, a discrete gate or a transistor logic device, and a discrete hardware component. The methods, steps and logical diagrams disclosed in the embodiments of the present application may be implemented or executed. The general processor may be a microprocessor or the processor may also be any conventional processor or the like. The steps of the method disclosed in the embodiments of the present application may be directly executed by a hardware decoding processor, or by a combination of the hardware and software modules in the decoding processor. The software modules may be located in a mature storage medium in the art, i.e. a random memory, a flash memory, a read-only memory, a programmable read-only memory, or an electrically erasable programmable memory, a register, etc. The storage medium is located in a memory, the processor reads information in the memory, and completes the steps of the above methods in combination with hardware thereof.

It may be understood that, the memory in the embodiments of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which functions as an external cache. Description is illustrative but not restrictive, RAM in many forms may be available, for example, a static random access memory (SRAM), a dynamic random access memory (DRAM), a synchronous dynamic random access memory (SDRAM), a double data rate synchronous dynamic random access memory (DDR SDRAM, an enhanced synchronous dynamic random access memory (ESDRAM), a synchronous connection dynamic random access memory (SLDRAM) and a direct Rambus random access memory (DR RAM). It should be noted that, the memories of the systems and methods described herein are intended to include, but is not limited to, these and any memory in other suitable types.

It should be understood that, description of the above memory is illustrative but not restrictive. For example, the memory in the embodiments of the present application may also be a static random access memory (SRAM), a dynamic random access memory (DRAM), a synchronous dynamic random access memory (SDRAM), a double data rate synchronous dynamic random access memory (DDR SDRAM, an enhanced synchronous dynamic random access memory (ESDRAM), a synchronous connection dynamic random access memory (SLDRAM) and a direct Rambus random access memory (DR RAM) and the like. That is to say, the memory in the embodiments of the present application is intended to include, but is not limited to, these and any memory in other suitable types.

An embodiment of the present application further provides a computer readable storage medium for storing a computer program.

In an embodiment, the computer readable storage medium may be applied to the network device in the embodiments of the present application, and the computer program may cause a computer to execute corresponding processes implemented by the network device in various methods in the embodiments of the present application. It is not described herein for simplicity.

In an embodiment, the computer readable storage medium may be applied to the mobile terminal/UE in the embodiments of the present application, and the computer program may cause a computer to execute corresponding processes implemented by the mobile terminal/UE in various methods in the embodiments of the present application. It is not described herein for simplicity.

An embodiment of the present application further provides a computer program product which includes computer program instructions.

In an embodiment, the computer program product may be applied to the network device in the embodiments of the present application, and the computer program instructions may cause a computer to execute corresponding processes implemented by the network device in various methods in the embodiments of the present application. It is not described herein for simplicity.

In an embodiment, the computer program product may be applied to the mobile terminal/UE in the embodiments of the present application, and the computer program instructions may cause a computer to execute corresponding processes implemented by the mobile terminal/UE in various methods in the embodiments of the present application. It is not described herein for simplicity.

An embodiment of the present application further provides a computer program.

In an embodiment, the computer program may be applied to the network device in the embodiments of the present application, when the computer program is run on a computer, the computer may be caused to execute corresponding processes implemented by the network device in various methods in the embodiments of the present application. It is not described herein for simplicity.

In an embodiment, the computer program may be applied to the mobile terminal/UE in the embodiments of the present application, when the computer program is run on a computer, the computer may be caused to execute corresponding processes implemented by the mobile terminal/UE in various methods in the embodiments of the present application. It is not described herein for simplicity.

Those skilled in the art may realize that, the units and algorithm steps described in the embodiments disclosed herein may be implemented in electronic hardware, or a combination of computer software and electronic hardware. Whether these functions are executed in a manner of hardware or software depends on the particular application and design constraints of the technical solution. Professionals may use different methods for each particular application to implement the described functions, but such implementations should not be considered to be beyond the scope of the present application.

A person skilled in the pertinent art may clearly understand that, for the convenience and simplicity of description, specific working processes of the systems, apparatuses and units described above may refer to the corresponding processes in the foregoing method embodiments, which are not described herein again.

In the several embodiments provided in the present application, it should be understood that, the disclosed systems, apparatuses and methods may be implemented in other manners. For example, the apparatus embodiments described above are merely schematic. For example, the division of the units is merely a logical function division, and there may be another division manner in an actual implementation. For example, a plurality of units or components may be combined or integrated in another system, or some features may be ignored or not performed. In another point, the displayed or discussed coupling to each other or direct coupling or a communication connection may be through some interfaces. Indirect coupling or a communication connection of the apparatuses or the units may be electrical, mechanical or in other forms.

The units described as separate components may or may not be physically separate, and the components displayed as units may or may not be physical units, that is, may be located in one place, or may be distributed to a plurality of network units. Some or all of the units may be selected according to actual needs to achieve the purpose of the solution of the present embodiment.

In addition, each functional unit in each embodiment of the present application may be integrated in one processing unit, or each unit may be physically present separately, or two or more units may be integrated in one unit.

The function may be stored in a computer readable storage medium if it is implemented in the form of a software function unit and sold or used as an independent product. Based on such understanding, the technical solutions of the present application, or a part contributing to the prior art, or a part of the technical solutions may be embodied in the form of a software product essentially. The computer software product is stored in a storage medium, which includes some instructions for enabling a computer device (which may be a personal computer, a server, or a network device, etc.) to execute all or part of the steps of the method described in each embodiment of the present application. The foregoing storage medium includes: a U disk, a mobile hard drive, a read-only memory (Read-Only Memory, ROM), a random access memory (Random Access Memory, RAM), a disk, or a compact disk, and any other medium that can store program codes.

The above are merely specific embodiments of the present application, but the protection scope of the present application is not limited thereto. Any variation or replacement readily conceivable by a person skilled in the art within the technical scope disclosed in the present application should be covered within the protection scope of the present application. Therefore, the protection scope of the present application should be defined by the protection scope of the claims.

What is claimed is:

1. A resource configuration method, which is applied to a terminal device, the terminal device is capable of establishing connections with a first network and a second network, wherein the method comprises:
    sending capability reference information of the terminal device to the first network and/or the second network; wherein the capability reference information is at least configured to assist a first network device of the first network and a second network device of the second network to allocate uplink time-domain resources for the terminal device; and
    acquiring an uplink time-domain resource configuration of the terminal device in the first network, and an uplink time-domain resource configuration of the terminal device in the second network;
    wherein the capability reference information of the terminal device comprises:
    a maximum uplink transmission time-slot ratio in a condition that the terminal device is under the maximum transmission power in the second network; and
    a specific absorption rate (SAR) effect ratio of the terminal at a working frequency band of the first network and a working frequency band of the second network under the same transmission power;
    wherein an uplink transmission mode for the terminal device is configured based on an uplink transmission ratio corresponding to the first network, wherein the uplink transmission ratio corresponding to the first network and an uplink transmission ratio corresponding to the second network is obtained by computing based on the maximum uplink transmission time-slot ratio and the SAR effect ratio;
    wherein the uplink transmission ratio corresponding to the first network and the uplink transmission ratio corresponding to the second network are computed based on the following inequality:

$$f*x\%*PLTE/P26 \text{ dBm}+y\%*PNR/P26 \text{ dBm}\leq z\%;$$

wherein z % is a maximum uplink transmission time-slot ratio of a second network carrier at 26 dBm, x % is an uplink transmission time-slot ratio which is actually scheduled by the first network, y % is an actual scheduling uplink time-slot ratio of the second network carrier, PLTE and PNR are linear values of maximum transmission power capabilities of a frequency division duplex (FDD) carrier of the long term evolution (LTE) and a time division duplex (TDD) carrier of the new radio NR under 4G radio access network and 5G radio access network dual-connectivity (EN-DC), P26 dBm is a linear power value at 26 dBm, and f is an SAR effect ratio.

2. The method according to claim 1, wherein the capability reference information of the terminal device comprises:
    a working frequency band combination of the terminal device in the first network and the second network, and one or more sets of maximum uplink transmission time ratio combinations corresponding to the working frequency band combination of the first network and the second network;
    wherein each set of the maximum uplink transmission time ratio combinations comprises a maximum uplink transmission time ratio of the first network and a maximum uplink transmission time ratio of the second network; and the maximum uplink transmission time ratio combinations of different sets comprise different maximum uplink transmission time ratios of the first network and/or different maximum uplink transmission time ratios of the second network.

3. The method according to claim 1, wherein the capability reference information of the terminal device comprises:
    a working frequency band combination of the terminal device in the first network and the second network; and
    at least one set of maximum uplink transmission time ratio combinations corresponding to different first transmission power in a condition that the terminal device is under at least one first transmission power in the first network;
    wherein each set of the maximum uplink transmission time ratio combinations comprises a maximum uplink transmission time ratio of the first network and a maximum uplink transmission time ratio of the second network; and the maximum uplink transmission time ration combinations of different sets comprise different maximum uplink transmission time ratios of the first network and/or different maximum uplink transmission time ratios of the second network.

4. A resource configuration method, which is applied to a first network device in a first network, the first network device establishes a connection with a terminal device, wherein the method comprises:
    acquiring capability reference information of the terminal device, wherein the terminal device is capable of establishing connections with the first network and a second network; and allocating an uplink time-domain resource in the first network for the terminal device based on the capability reference information;

wherein the capability reference information of the terminal device comprises:

a maximum uplink transmission time-slot ratio in a condition that the terminal device is under the maximum transmission power in the second network; and a specific absorption rate (SAR) effect ratio of the terminal at a working frequency band of the first network and a working frequency band of the second network under the same transmission power;

wherein the allocating the uplink time-domain resource in the first network for the terminal device based on the capability reference information comprises:

computing, based on the maximum uplink transmission time-slot ratio and the SAR effect ratio, to obtain an uplink transmission ratio corresponding to the first network and an uplink transmission ratio corresponding to the second network; and configuring an uplink transmission mode for the terminal device based on the uplink transmission ratio corresponding to the first network;

wherein the method further comprises:

computing the uplink transmission ratio corresponding to the first network and the uplink transmission ratio corresponding to the second network based on the following inequality:

$$f*x\%*PLTE/P26 \text{ dBm}+y\%*PNR/P26 \text{ dBm} \leq z\%;$$

wherein z % is a maximum uplink transmission time-slot ratio of a second network carrier at 26 dBm, x % is an uplink transmission time-slot ratio which is actually scheduled by the first network, y % is an actual scheduling uplink time-slot ratio of the second network carrier, PLTE and PNR are linear values of maximum transmission power capabilities of a frequency division duplex (FDD) carrier of the long term evolution (LTE) and a time division duplex (TDD) carrier of the new radio NR under 4G radio access network and 5G radio access network dual-connectivity (EN-DC), P26 dBm is a linear power value at 26 dBm, and f is an SAR effect ratio.

5. The method according to claim 4, wherein the capability reference information of the terminal device comprises:

a working frequency band combination of the terminal device in the first network and the second network, and one set of maximum uplink transmission time ratio combinations corresponding to the working frequency band combination of the first network and the second network;

wherein a maximum uplink transmission time ratio combination comprises: a maximum uplink transmission time ratio of the first network and a maximum uplink transmission time ratio of the second network.

6. The method according to claim 5, wherein the allocating the uplink time-domain resource in the first network for the terminal device based on the capability reference information comprises:

configuring a static or semi-static uplink transmission mode for the terminal device based on the maximum uplink transmission time ratio of the first network in the maximum uplink transmission time ratio combination.

7. The method according to claim 4, wherein the capability reference information of the terminal device comprises:

a working frequency band combination of the terminal device in the first network and the second network, and multiple sets of maximum uplink transmission time ratio combinations corresponding to the working frequency band combination of the first network and the second network;

wherein each set of the maximum uplink transmission time ratio combinations comprises a maximum uplink transmission time ratio of the first network and a maximum uplink transmission time ratio of the second network; and the maximum uplink transmission time ratio combinations of different sets comprise different maximum uplink transmission time ratios of the first network and/or different maximum uplink transmission time ratios of the second network.

8. The method according to claim 7, wherein the allocating the uplink time-domain resource in the first network for the terminal device based on the capability reference information comprises:

determining a corresponding target maximum uplink transmission time ratio combination based on an uplink ratio of the terminal device in the second network; and configuring a static or semi-static uplink transmission mode for the terminal device based on the maximum uplink transmission time ratio of the first network in the target maximum uplink transmission time ratio combination.

9. A network device, comprising: a processor and a memory being configured to store a computer program runnable on the processor, wherein the memory is configured to store the computer program, and the processor is configured to invoke and run the computer program stored in the memory, so as to:

acquire capability reference information of the terminal device, wherein the terminal device is capable of establishing connections with the first network and a second network; and allocate an uplink time-domain resource in the first network for the terminal device based on the capability reference information;

wherein the capability reference information of the terminal device comprises:

a maximum uplink transmission time-slot ratio in a condition that the terminal device is under the maximum transmission power in the second network; and a specific absorption rate (SAR) effect ratio of the terminal at a working frequency band of the first network and a working frequency band of the second network under the same transmission power;

wherein the processor is further configured to:

compute, based on the maximum uplink transmission time-slot ratio and the SAR effect ratio, to obtain an uplink transmission ratio corresponding to the first network and an uplink transmission ratio corresponding to the second network; and configure an uplink transmission mode for the terminal device based on the uplink transmission ratio corresponding to the first network;

wherein the processor is further configured to:

compute the uplink transmission ratio corresponding to the first network and the uplink transmission ratio corresponding to the second network based on the following inequality:

$$f*x\%*PLTE/P26 \text{ dBm}+y\%*PNR/P26 \text{ dBm} \leq z\%;$$

wherein z % is a maximum uplink transmission time-slot ratio of a second network carrier at 26 dBm, x % is an uplink transmission time-slot ratio which is actually scheduled by the first network, y % is an actual scheduling uplink time-slot ratio of the second network carrier, PLTE and PNR are linear values of maximum transmission power capabilities of a frequency division duplex (FDD) carrier of the long term evolution (LTE) and a time division duplex (TDD) carrier of the new radio NR under 4G radio access network and 5G radio access network dual-connectivity (EN-DC), P26 dBm is a linear power value at 26 dBm, and f is an SAR effect ratio.

10. The network device according to claim 9, wherein the capability reference information of the terminal device comprises:
   a working frequency band combination of the terminal device in the first network and the second network, and one set of maximum uplink transmission time ratio combinations corresponding to the working frequency band combination of the first network and the second network;
   wherein a maximum uplink transmission time ratio combination comprises: a maximum uplink transmission time ratio of the first network and a maximum uplink transmission time ratio of the second network.

11. The network device according to claim 10, wherein the processor is further configured to: configure a static or semi-static uplink transmission mode for the terminal device based on the maximum uplink transmission time ratio of the first network in the maximum uplink transmission time ratio combination.

12. The network device according to claim 9, wherein the capability reference information of the terminal device comprises:
   a working frequency band combination of the terminal device in the first network and the second network, and multiple sets of maximum uplink transmission time ratio combinations corresponding to the working frequency band combination of the first network and the second network;
   wherein each set of the maximum uplink transmission time ratio combinations comprises a maximum uplink transmission time ratio of the first network and a maximum uplink transmission time ratio of the second network; and the maximum uplink transmission time ratio combinations of different sets comprise different maximum uplink transmission time ratios of the first network and/or different maximum uplink transmission time ratios of the second network.

13. The network device according to claim 12, wherein the processor is further configured to:
   determine a corresponding target maximum uplink transmission time ratio combination based on an uplink ratio of the terminal device in the second network; and
   configure a static or semi-static uplink transmission mode for the terminal device based on the maximum uplink transmission time ratio of the first network in the target maximum uplink transmission time ratio combination.

* * * * *